United States Patent
Akaike et al.

(10) Patent No.: US 10,674,137 B2
(45) Date of Patent: Jun. 2, 2020

(54) DISPLAY CONTROL, APPARATUS, DISPLAY SYSTEM, DISPLAY CONTROL METHOD, AND NON-TRANSITORY RECORDING MEDIUM

(71) Applicants: Mana Akaike, Tokyo (JP); Nobuyuki Kishi, Tokyo (JP)

(72) Inventors: Mana Akaike, Tokyo (JP); Nobuyuki Kishi, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 184 days.

(21) Appl. No.: 15/982,106

(22) Filed: May 17, 2018

(65) Prior Publication Data
US 2018/0338136 A1    Nov. 22, 2018

(30) Foreign Application Priority Data

May 19, 2017   (JP) .................................. 2017-100366
May 1, 2018    (JP) .................................. 2018-088414

(51) Int. Cl.
*G06K 9/00*    (2006.01)
*H04N 13/261*    (2018.01)
(Continued)

(52) U.S. Cl.
CPC .......... *H04N 13/261* (2018.05); *A63F 13/63* (2014.09); *A63F 13/655* (2014.09); *A63H 19/24* (2013.01);
(Continued)

(58) Field of Classification Search
CPC ....... G06T 13/20; G06T 15/005; G06T 15/02; G06T 11/20; G06T 13/00; G06T 15/10;
(Continued)

(56) References Cited

U.S. PATENT DOCUMENTS

| 5,072,900 A | * | 12/1991 | Malon ................. B61L 27/0038 246/182 B |
| 2003/0051255 A1 | * | 3/2003 | Bulman ................. G06Q 30/00 725/135 |

(Continued)

FOREIGN PATENT DOCUMENTS

JP    2009-101122    5/2009

*Primary Examiner* — Li Liu
(74) *Attorney, Agent, or Firm* — Oblon, McClelland, Maier & Neustadt, L.L.P.

(57) ABSTRACT

A display control apparatus includes circuitry to acquire a user image including a manually-drawn image, extract a character image corresponding to the manually-drawn image from the user image, generate an image of a first user object that is a three-dimensional object of the character image to be appeared in a display area that is to be displayed as a display image with a display, and cause the image of the first user object to move on a railroad track on the display area. The circuitry couples the image of the first user object to an image of a second user object in response to determination indicating a distance between the images of the first and second user objects on the railroad track satisfies a predetermined condition, and separates the image of the first user object from the second user object at a fork according to a predetermined condition for changing a course.

13 Claims, 26 Drawing Sheets

(51) Int. Cl.
*A63H 19/24* (2006.01)
*G06T 15/10* (2011.01)
*A63H 33/00* (2006.01)
*A63F 13/63* (2014.01)
*A63F 13/655* (2014.01)
*G06T 15/02* (2011.01)
*G06T 13/20* (2011.01)
*A63F 13/803* (2014.01)

(52) U.S. Cl.
CPC .............. *A63H 33/00* (2013.01); *G06T 13/20* (2013.01); *G06T 15/02* (2013.01); *G06T 15/10* (2013.01); *A63F 13/803* (2014.09)

(58) Field of Classification Search
CPC ....... G06T 17/05; G06T 19/00; G06T 19/006; G06T 19/20; G06T 2200/24; G06T 2207/10008; A63F 13/10; A63F 13/12; A63F 13/52
See application file for complete search history.

(56) References Cited

U.S. PATENT DOCUMENTS

| | | | |
|---|---|---|---|
| 2006/0003843 A1* | 1/2006 | Kobayashi | A63F 13/10 463/43 |
| 2006/0281511 A1* | 12/2006 | Holm | A63F 13/10 463/9 |
| 2008/0242429 A1 | 10/2008 | Itoh et al. | |
| 2011/0248995 A1* | 10/2011 | Vaughan | G06K 9/44 345/420 |
| 2014/0333612 A1* | 11/2014 | Itoh | G09G 3/003 345/419 |
| 2015/0095784 A1* | 4/2015 | Funami | G06F 3/0481 715/730 |
| 2018/0047209 A1* | 2/2018 | Funami | H04N 1/32149 |
| 2018/0082618 A1* | 3/2018 | Kishi | G06T 11/20 |

* cited by examiner

DISPLAY CONTROL, APPARATUS, DISPLAY SYSTEM, DISPLAY CONTROL METHOD, AND NON-TRANSITORY RECORDING MEDIUM

CROSS-REFERENCE TO RELATED APPLICATIONS

This patent application is based on and claims priority pursuant to 35 U.S.C. § 119(a) to Japanese Patent Application Nos. 2017-100366, filed on May 19, 2017 and 2018-088414, filed on May 1, 2018, in the Japan Patent Office, the entire disclosures of which are hereby incorporated by reference herein.

BACKGROUND

Technical Field

Embodiments of the present disclosure relate to a display control apparatus, a display system, a display control method, and a non-transitory recording medium storing a program.

Related Art

The improvement of computer performance in recent years enables a computer to easily display an image with computer graphics using three-dimensional coordinates (hereinafter referred to as "three-dimensional graphics (3DCG)"). With the 3DCG, one or more objects are displayed in a three-dimensional space as dynamic images that moves periodically or randomly. Further, each object to be displayed as a dynamic image moving individually in the three-dimensional coordinate space.

With such 3DCG, a picture drawn by hand of a user is read by a scanner to generate an image, and motion is given to the image to be displayed as a moving image in a prepared three-dimensional space.

SUMMARY

Example embodiments of the present disclosure include a display control apparatus including circuitry. The circuitry acquires a user image including a manually-drawn image, extracts a character image corresponding to the manually-drawn image from the user image, generates an image of a first user object that is a three-dimensional object of the character image to be appeared in a display area that is to be displayed as a display image with a display, and causes the image of the first user object to move on a railroad track on the display area. The circuitry couples the image of the first user object to an image of a second user object in response to determination that a distance between the image of the first user object and the image of the second user object on the railroad track satisfies a predetermined condition, and separates the image of the first user object from the image of the second user object at a fork on the railroad track according to a predetermined condition for changing a course of the image of the first user object.

BRIEF DESCRIPTION OF THE DRAWINGS

A more complete appreciation of the disclosure and many of the attendant advantages and features thereof can be readily obtained and understood from the following detailed description with reference to the accompanying drawings, wherein.

Figure 1:
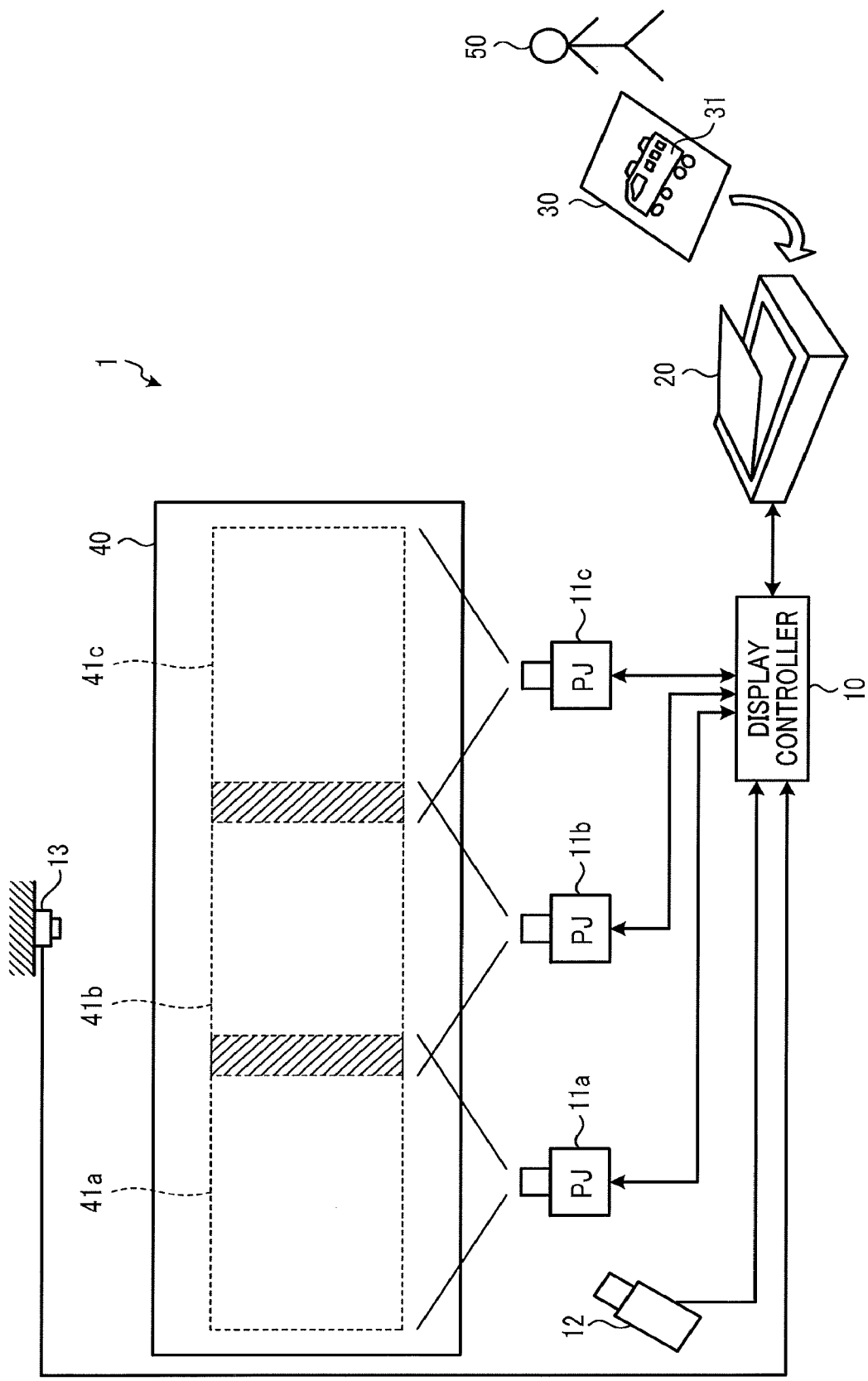
FIG. 1 is a schematic view illustrating an overall configuration of a display system according to one of the embodiments.

The accompanying drawings are intended to depict example embodiments of the present disclosure and should not be interpreted to limit the scope thereof. The accompanying drawings are not to be considered as drawn to scale unless explicitly noted.

DETAILED DESCRIPTION

The terminology used herein is for describing particular embodiments only and is not intended to be limiting of the present disclosure. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof. In describing preferred embodiments illustrated in the drawings, specific terminology is employed for the sake of clarity. However, the disclosure of this patent specification is not intended to be limited to the specific terminology so selected, and it is to be understood that each specific element includes all technical equivalents that have the same function, operation in a similar manner, and achieve a similar result.

A display controller (display control apparatus), a display system, a display control method, and a non-transitory recording medium according to one or more embodiments of the present disclosure are described below with reference to the attached drawings, FIG. 1 to FIG. 25. The present disclosure, however, is not limited to the following embodiments, and the constituent elements of the following embodiments include those which can be easily conceived by those skilled in the art, those being substantially the same ones, and those being within equivalent ranges. Furthermore, various omissions, substitutions, changes and combinations of the constituent elements can be made without departing from the gist of the following embodiments.

<<Overall Configuration of Display System>>

FIG. 1 is a schematic view illustrating an overall configuration of a display system 1 according to one of the embodiments. A description is given below of the overall configuration of the display system 1 according to the present embodiment with reference to FIG. 1.

As illustrated in FIG. 1, the display system 1 according to the present embodiment includes a display controller (display control apparatus) 10, projectors (image displaying devices) 11a, 11b, and 11c, a camera 12, and an area sensor 13.

The display controller 10 performs image processing on image data representing a picture 31 obtained by reading a sheet of paper (sheet) 30 with a scanner 20 to generate scan image data. Examples of the display controller 10 include an information processing apparatus such as a personal computer (PC) and a work station. The display controller 10 transmits to the projectors 11a, 11b, and 11c, projection image data that is generated based on the scan image data and includes a train car object (user object), which is described later. More specifically, the display controller 10 transmits the projection image data that is two-dimensional projection image data representing a three-dimensional image data space, including the train car object in a manner that the projection image data is divided by the number of the projectors 11a, 11b, and 11c, and each of the projectors 11a, 11b, and 11c receives a corresponding divided part of the projection image data.

Based on the projection image data received from the display controller 10, the projectors 11a, 11b, and 11c project projection images 41a, 41b, and 41c, respectively, on a screen 40, which serves as a displaying medium. Hereinafter, the projectors 11a, 11b, and 11c may be simply referred to as a "projector(s) 11" in referring to an arbitrary one of the projectors 11a, 11b, and 11c or referring collectively to the projectors 11a, 11b, and 11c. Additionally, a projection image made of the projection images 41a, 41b, and 41c is referred to as a "projection image 41".

As illustrated in FIG. 1, the projection images 41a, 41b, and 41c individually have one or two overlapped areas each of which is an area where two images of the projection images 41a, 41b, and 41c adjacent to each other are overlapped with each other when each image is projected on the screen 40 with a corresponding one of the projectors 11a, 11b, and 11c, however the embodiments are not limited to this. In the example embodiment illustrated in FIG. 1, the camera 12 captures the projection images 41a, 41b, and 41c projected on the screen 40 and the display controller 10 adjusts the overlapped areas of the projection images 41a, 41b, and 41c by controlling the projectors 11a, 11b, and 11c.

The display system 1 illustrated in FIG. 1 includes the three projectors 11a, 11b, and 11c, however the embodiments are not limited to this. In one or more embodiments, the display system 1 includes one, two, or more than three projectors 11.

The camera 12 captures the projection image 41 projected by the projector 11 on the screen 40 and transmits the captured image to the display controller 10. The display controller 10 controls the projectors 11a, 11b, and 11c according to the captured image received from the camera 12 and adjusts the overlapped area of the projection images 41a, 41b, and 41c.

The area sensor 13 senses an object, such as a hand of the user in front of the screen 40, and transmits information on a position of the object to the display controller 10. The information, hereinafter, may be referred to as position information. The area sensor 13 is disposed on a ceiling located above the screen 40, for example, as illustrated in FIG. 1. The display controller 10 associates the position information on the object, such as the user's hand, received from the area sensor 13 with a position on the projection image (displayed image) 41 projected on the screen 40 to specify where in the projection image 41 the user's hand points at and then processes a predetermined event. In the following description of the embodiments, an action of the user to point at a specific position on the projection image 41 may be expressed with a terminology of "touch". The user may or may not come into direct contact with the screen 40, as long as the area sensor 13 senses or detects the user's hand when the user touches in relation to the projection image 41. A detailed description of the predetermined event is deferred. As described above, the display system 1 provides an interactive circumstance in which the predetermined event is performed in response to touching operation of the user.

The scanner 20 reads the sheet of paper 30 on which a user 50 draws the picture 31 by hand, and generates image data to be transmitted to the display controller 10. The display controller 10 performs predetermined image processing on the image data received form the scanner 20 to obtain scan image data, and extracts a part of the scan image data corresponding to the picture 31 from the scan image data, and stores the extracted image data as character image data.

With the configuration of the display system 1 as described above, the display controller 10 gives motion to the train car object, namely causes the train car object to move in the image data space. For example, the display controller 10 obtains one or more feature values of the character image data that is a base of the train car object, and generates one or more parameters associated with movements, or the motion, of the train car object based on the one or more feature values. The display controller 10 gives the motion to the train car object in the image data space by applying the parameters to the train car object. A detailed description of this operation of the display system 1 is deferred.

This allows the user 50 to observe the train car object, which is obtained based on the picture 31 drawn by user's hand, as a moving image moving in the three-dimensional image data space according to the features of the drawn picture 31. Additionally, the display controller 10 may add other train car objects to the same image data space. Accordingly, the plurality of pictures 31, each of which is drawn on each sheet 30 by each user 50, moves in the same image data space through the above-described process performed by each user 50. Alternatively, the same user 50 may repeat the same process described above a plurality of times. The display controller 10 causes the train car objects each of which is obtained based on a corresponding one of the plurality of pictures 31 to be displayed as the moving images that move in the three-dimensional data space. This allows the users 50 to observe the train car objects in moving.

In the description of the embodiment, a train car is used as an example of the picture 31, however, the picture 31 may be include more than one train cars connected to each other. Additionally, the user 50 may create an image that has a three-dimensional design instead of drawing a picture on a single sheet 30. For example, the user 50 may create a three-dimensional object (three-dimensional train car object) by drawing a plurality of pictures using the plurality of sheets 30 and combining the plurality of sheets 30 to compose the plurality of pictures together.

Instead of the sheets of paper 30, the user 50 may use an information processing terminal such as a tablet terminal integrated with a display device and an input device which is capable of inputting coordinate information according to a position specified with user input from the input device. In this case, the information processing terminal displays the three-dimensional object on a screen displayed with the display device. This allows the user 50 to draw a picture while rotating the picture by operating the input device, and thus the user 50 is able to directly draw the picture in relation to the three-dimensional object displayed on the screen of the information processing terminal.

In the description of the embodiments here, a paper medium such as the sheet of paper 30 is used for drawing a picture by the user 50, however the embodiments of the disclosure are not limited to this. In one or more embodiments, the information processing terminal is used, and the user 50 uses the information processing terminal to draw a picture via a screen displayed. Therefore, using the paper medium is not intended to be limiting.

(Hardware Configuration of Display Controller)

Figure 2:
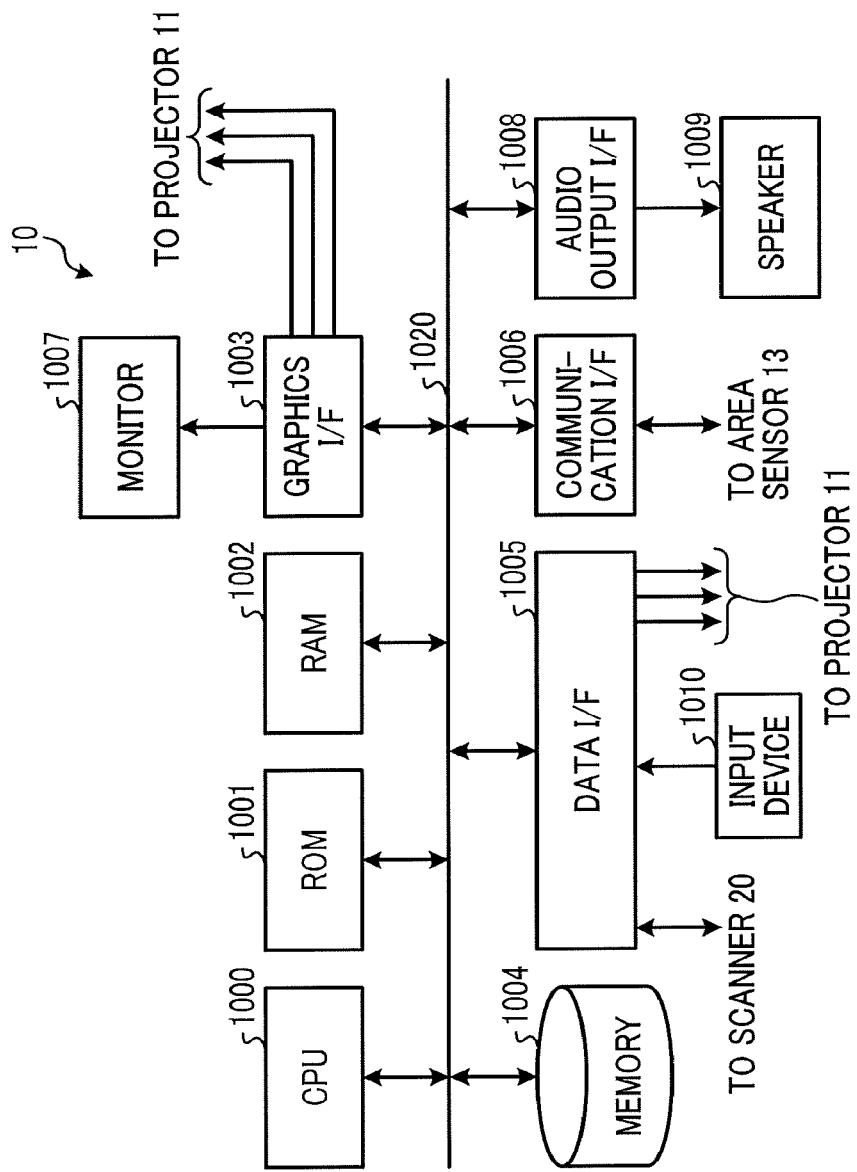
FIG. 2 is a block diagram illustrating a hardware configuration of a display controller according to the one of the embodiments.

FIG. 2 is a block diagram illustrating the hardware configuration of the display controller 10 according to the present embodiment. A description is given below of the hardware configuration of the display controller 10 according to the present embodiment with reference to FIG. 2.

As illustrated in FIG. 2, the display controller 10 according to the present embodiment includes a central processing unit (CPU) 1000, a read only memory (ROM) 1001, a random access memory (RAM) 1002, a graphics interface (I/F) 1003, a memory 1004, a data interface (I/F) 1005, a communication interface (I/F) 1006, a monitor 1007, an audio output interface (I/F) 1008, and a speaker 1009.

The CPU 1000 is a computing device that controls the overall operation of the display controller 10. The ROM 1001 is a nonvolatile storage device that stores a basic input/output system (BIOS) for the display controller 10 and a program. The RAM 1002 is a volatile storage device that is used as a working area in which the CPU 1000 executes a program.

The graphics I/F 1003 is an interface for transmitting image data used for displaying an image on the monitor 1007 and projecting the image with the projector 11.

The memory 1004 is a storage device, such as a hard disk drive (HDD), a solid state drive (SSD), a flash memory, used to store scan image data, character image data, parameters generated and analysis result information that are obtained when the character image data is extracted, and various programs.

The data I/F 1005 is an interface for establishing a data communication with each of the scanner 20 and the projector 11 and for receiving operation information from an input device 1010. For example, the data I/F 1005 transmits a control signal generated by the CPU 1000 to the scanner 20 and the projector 11. As an example of the data I/F 1005, a universal serial bus (USB) is used.

The communication I/F 1006 is an interface for connecting to a network, such as the Internet, to establish a data communication. In the example of FIG. 2, the communication I/F 1006 is communicably connected to the area sensor 13 and receives position information of an object sensed by the area sensor 13. As one example of the communication I/F 1006, a network interface card (NIC) capable of establishing a data communication using protocols of transmission control protocol/Internet protocol (TCP/IP).

The monitor 1007 is a display device that displays various types of information including a cursor, a menu, a window, a character, and an image, and a screen of an application executed by the CPU 1000 Examples of the monitor 1007 include, for example, a cathode ray tube (CRT) display, a liquid crystal display, and an organic electro-luminescence (EL) display. The monitor 1007 is connected to a main body of the display controller 10 using a video graphics array (VGA) cable, a high-definition multimedia interface (HDMI) (registered trademark) cable, or an Ethernet (registered trademark) cable, for example.

The audio output I/F 1008 is an interface for outputting audio data to the speaker 1009. The speaker 1009 is a device that outputs sound based on the audio data received according to the operation of the application executed by the CPU 1000.

The input device 1010 includes a key board and a mouse each of which is operated by a user to select a character, a number, or input an instruction, such as moving the cursor, and setting setting information, for example.

The CPU 1000, the ROM 1001, the RAM 1002, the graphics I/F 1003, the memory 1004, the data I/F 1005, the communication I/F 1006, and the audio output I/F 1008 are communicably connected to each other through a bus 1020, such as an address bus and a data bus.

The hardware configuration illustrated in FIG. 2 is merely one example of the embodiments. In one or more embodiments, the hardware configuration of the display controller 10 may not include all of the elements described above or may include other elements in addition to the elements described above.

(Functional Configuration of Display Controller)

Figure 3:
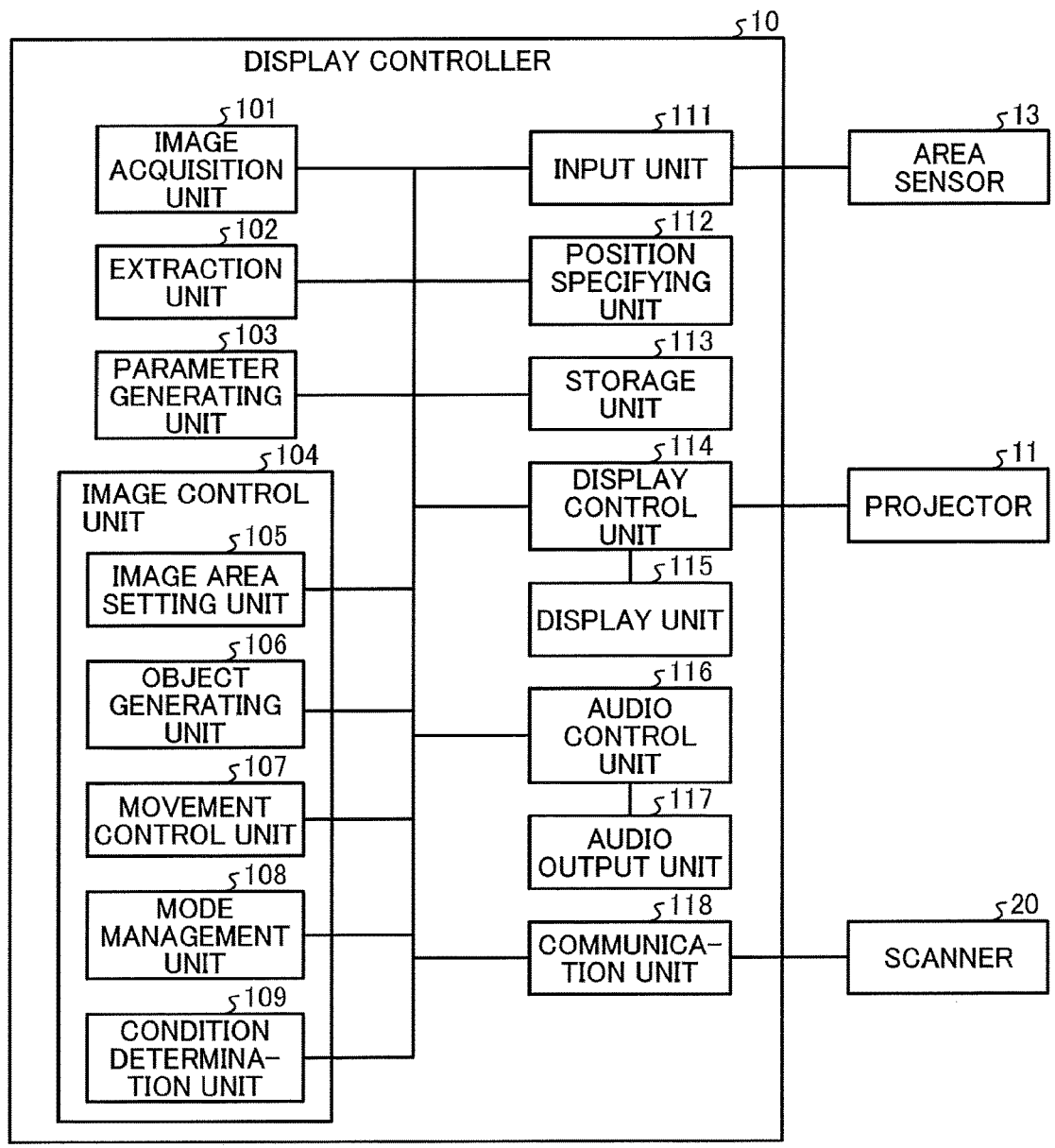
FIG. 3 is a block diagram illustrating a functional configuration of the display controller according to the one of the embodiments.
Figure 4:
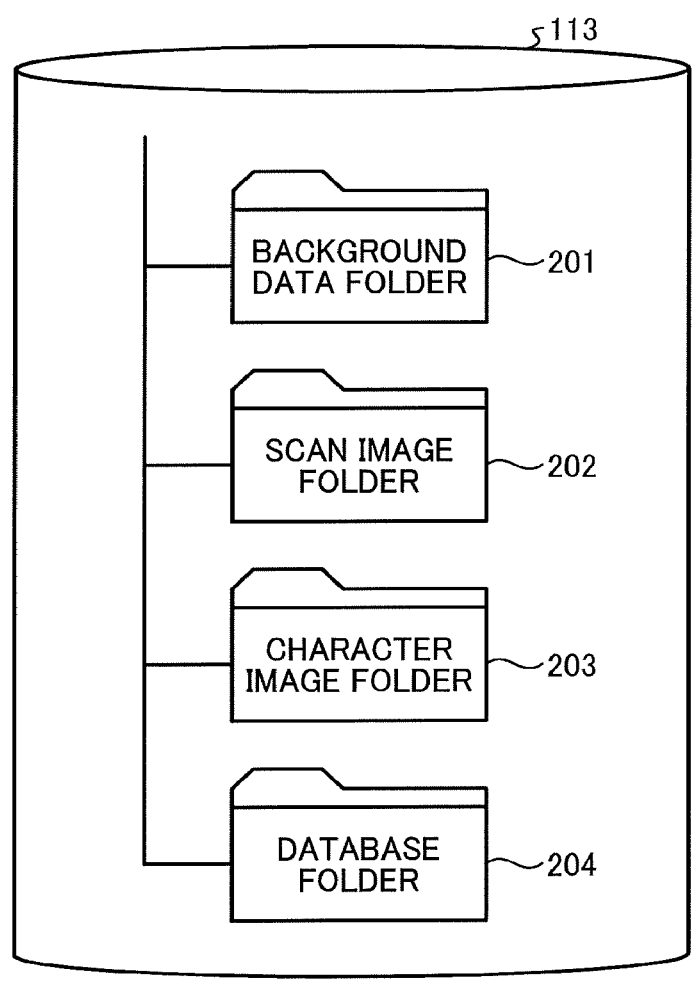
FIG. 4 is a diagram illustrating a folder structure in a storage unit.

FIG. 3 is a block diagram illustrating a functional configuration of the display controller 10 according to the present embodiment. FIG. 4 is a diagram illustrating a folder structure in a storage unit 113, which is described later, according to the present embodiment. A description is given of the functional configuration of the display controller 10 according to the present embodiment with reference to FIGS. 3 and 4.

Referring to FIG. 3, the display controller 10 according to the present embodiment includes an image acquisition unit (acquisition unit) 101, an extraction unit 102, a parameter generating unit 103, an image control unit 104, an input unit 111, a position specifying unit (specifying unit) 112, the storage unit 113, a display control unit 114, a display unit 115, an audio control unit 116, an audio output unit 117, and a communication unit 118.

The image acquisition unit 101 is a functional unit that acquires image data obtained by scanning the sheet of paper 30 with the scanner 20 as scan image data via the communication unit 118. The image acquisition unit 101 causes the storage unit 113 to store the acquired scan image data. The image acquisition unit 101 is implemented with a program executed by the CPU 1000 illustrated in FIG. 2, for example.

The extraction unit 102 is a functional unit that extracts from the scan image data acquired by the image acquisition unit 101, character image data corresponding to a picture drawn in a drawing area, which is described later, on the sheet of paper 30. The extraction unit 102 also extracts title image data that corresponds to a name of a character (train car) written in a title area, which is described later. The extraction unit 102 causes the storage unit 113 to store the extracted character image data and the extracted title image data. The extraction unit 102 is implemented with a program executed by the CPU 1000 illustrated in FIG. 2, for example. In the following description, the scan image data, the character image data, and the title image data may be simply referred to as a "scanned image", a "character image", and a "title image", respectively.

The parameter generating unit 103 is a functional unit that analyzes the character image extracted from the extraction unit 102, and generates a parameter that defines a movement of the three-dimensional object (train car object) obtained based on the character image according to an analysis result. The parameter generating unit 103 causes the storage unit 113 to store information indicating the analysis result (analysis result information) and the generated parameter. The parameter generating unit 103 is implemented with a program executed by the CPU 1000 illustrated in FIG. 2, for example.

The image control unit 104 is a functional unit that causes the three-dimensional object, which is obtained based on the character image extracted by the extraction unit 102, to move according to the parameters generated by the parameter generating unit 103. The image control unit 104 includes a display area setting unit 105, an object generating unit 106, a movement control unit 107, a mode management unit 108, and a condition determination unit (determination unit) 109.

The display area setting unit 105 is a functional unit that sets a display area where the projection image 41 is projected in relation to an image data space having a three-dimensional system using a three-dimensional coordinate (x, y, z). The display area setting unit 105 also disposes fixed objects including, for example, a railroad track object 71, fixed objects 62 and 63, and start point object 72, which are described later (see FIG. 5). The three-dimensional image space is deferred. The display area setting unit 105 is implemented with a program executed by the CPU 1000 illustrated in FIG. 2, for example.

The object generating unit 106 is a functional unit that generates the three-dimensional object (train car object) that is three-dimensionally structured based on the character image extracted by the extraction unit 102. The object generating unit 106 adds the generated three-dimensional object to the image data space in a manner that the three-dimensional object is displayed on the projection image 41. The object generating unit 106 is implemented with a program executed by the CPU 1000 illustrated in FIG. 2, for example.

The movement control unit 107 is a functional unit that gives the motion to the three-dimensional object (train car object) put in the image data space according to the parameter generated by the parameter generating unit 103. The movement control unit 107 is implemented with a program executed by the CPU 1000 illustrated in FIG. 2, for example.

The mode management unit 108 is a functional unit that sets and changes a movement mode of the train car object controlled by the movement control unit 107. Examples of the movement mode includes a following mode, a coupling mode, and a normal mode. In the following mode, the train car object is in a state of being coupled with another train car object from behind and following the train car object. In the coupling mode, the train car object is in a state of accelerating, or increasing a speed to couple with another train car object traveling in front of the train car object when a distance between the train car objects satisfies with a predetermined condition regarding a predetermined distance. In the normal mode, the train car object is neither in a state of the following mode or the coupling mode. The mode management unit 108 is implemented with a program executed by the CPU 1000 illustrated in FIG. 2, for example.

The condition determination unit 109 determines various conditions, at predetermined times, in the image data space in which the train car object moves. Specifically, the image data space is where the train car objects travels on a railroad track object (which is described later) displayed to be arranged in the image data space. For example, the condition determination unit 109 performs determination including, for example, whether the train car object is currently on a main railroad track or a branch railroad track (spur) of the railroad track objects, which movement mode the train car object is currently in, whether the train car object takes the spur at a fork from the main railroad track or not, and whether touching operation of the user is detected or not. The condition determination unit 109 is implemented with a program executed by the CPU 1000 illustrated in FIG. 2, for example.

The input unit 111 is a functional unit that inputs information on operation performed from the input device 1010 and position information obtained when the area sensor 13 detects the touching operation. The input unit 111 is implemented with the data I/F 1005, the communication I/F 1006, and a program executed by the CPU 1000 illustrated in FIG. 2, for example.

The position specifying unit 112 specifies a position where on the projection image 41 the user's hand points at by associating the position information indicating a position of the user's hand, which is input from the area sensor 13 using the input unit 111 with a position on the projection image 41. The position specifying unit 112 is implemented with a program executed by the CPU 1000 illustrated in FIG. 2, for example.

The storage unit 113 is a functional unit that stores the scan image data, the character image data, and the parameters generated and the analysis result information obtained when the character image data is extracted. The storage unit 113 also stores display limited number information and the various programs. The display limited number information is information indicating a maximum number (limited number) of the train car objects to be displayed in the image data space.

The storage unit 113 has a folder structure storing various data as illustrated in FIG. 4, for example. As illustrated in FIG. 4, the storage unit 113 includes a background data folder 201, a scan image folder 202, a character image folder 203, and a database folder 204. However, the embodiments are not limited to the folder structure illustrated in FIG. 4 and may have other types of folders.

The background data folder 201 is a folder that stores railroad track object data, a railroad track image mapping to the railroad track object, fixed object data representing, for example, a building, and fixed data representing, for example, a background image. By rewriting various data stored in the background data folder 201, the user customizes the fixed object displayed to be arranged in the image data space.

The scan image folder 202 is a folder that stores scan image data acquired by the image acquisition unit 101. The extraction unit 102 extracts the character image data from the scan image data stored in the scan image folder 202, and the parameter generating unit 103 analyzes the character image data. At this time, the scan image data for which the parameters are generated is deleted from the scan image folder 202. Additionally, all of the scan image data stored in the scan image folder 202 is deleted when the application, which is currently executed by the CPU 1000, deactivates.

The character image folder 203 is a folder that stores the character image data extracted by the extraction unit 102, the analysis result information obtained by analyzing the character image data by the parameter generating unit 103, and the parameters generated by the parameter generating unit 103. The character image data, the title image data, the analysis result information, and the parameters corresponding to the train car object, which is displayed to be arranged in the image data space, configures a unit of a data group. Based on the character image data stored in the character image folder 203, the train car object is generated and displayed to be arranged in the image data space. When the number of data groups including the character image data, the title image data, the analysis result information, and the parameters, each of which corresponds to the train car object displayed to be arranged in the image data space, stored in the character image folder 203 exceeds the maximum number (limited number) indicated with the display limited number information described above, the data groups corresponding to the train car objects are deleted one by one from the oldest one. A detailed description of this is deferred. Additionally, all of the data groups, each of which corresponds to each train car object and includes the corresponding character image data, the corresponding title image data, the corresponding analysis result information, and the corresponding parameters, stored in the character image folder 203 are deleted when the application currently executed by the CPU 1000 deactivates.

Similar to the character image folder 203, the database folder 204 is a folder that stores the character image data extracted by the extraction unit 102, the analysis result information obtained by analyzing the character image data by the parameter generating unit 103, and the parameters generated by the parameter generating unit 103 as well as the character image folder 203. In the case of the database folder 204, the data groups including the character image data, the title image data, the analysis result information, and the parameters are not deleted even when the application currently executed by the CPU 1000 deactivates. Accordingly, the data group corresponding to the train car object that is deleted from the image data space stays to be stored in the database folder 204 so that the analysis result information may be used for developing or changing the application even after the train car object is deleted, and this achieves to provide the user 50 with a service using the character image data obtained based on the picture drawn by the user 50.

The storage unit 113 is implemented with the memory 1004 illustrated in FIG. 2.

The display control unit 114 controls the projector 11 and the display unit 115. More specifically, the display control unit 114 causes the display unit 115 to display bidimensionally a display area set by the display area setting unit 105 from the three-dimensional space, and transmits to the projector 11 image data representing the display area and causes the projector 11 to display the transmitted image data as projection image data. The display control unit 114 is implemented with the graphics I/F 1003 illustrated in FIG. 2 and a program executed by the CPU 1000.

The display unit 115 is a functional unit that displays the image data under control of the display control unit 114. The display unit 115 is implemented with the monitor 1007 illustrated in FIG. 2.

The audio control unit 116 is a functional unit that controls the audio output unit 117. The audio control unit 116 is implemented with the audio output I/F 1008 illustrated in FIG. 2 and a program executed by the CPU 1000.

The audio output unit 117 is a functional unit that outputs audio data under control of the audio control unit 116. The audio output unit 117 is implemented with the speaker 1009 illustrated in FIG. 2.

The communication unit 118 is a functional unit that establishes a data communication with the scanner 20. More specifically, the communication unit 118 receives image data read from the sheet of paper 30 by the scanner 20. The communication unit 118 is implemented with the data I/F 1005 illustrated in FIG. 2 and a program executed by the CPU 1000.

Additionally, each of the functional units (the image acquisition unit 101, the extraction unit 102, the parameter generating unit 103, the display area setting unit 105, the object generating unit 106, the movement control unit 107, the mode management unit 108, the condition determination unit 109, and the position specifying unit 112), illustrated in FIG. 3, of the display controller 10, may be implemented by the program executed by the CPU 1000 of FIG. 2, namely with software, with hardware such as an integrated circuit, or with both of the software and the hardware.

Additionally, the functional units illustrated in FIG. 3 of the display controller 10 are functions illustrated conceptually, and the functional configuration illustrated in FIG. 3 is not limiting the embodiments. For example, the plurality of functional units each of which is illustrated as an independent unit in FIG. 3 may be collectively configured as one functional unit. Alternatively, one of the plurality of functional units illustrated in FIG. 3 may be divided into a plurality of functional units.

(Projection Image)

Figure 5:
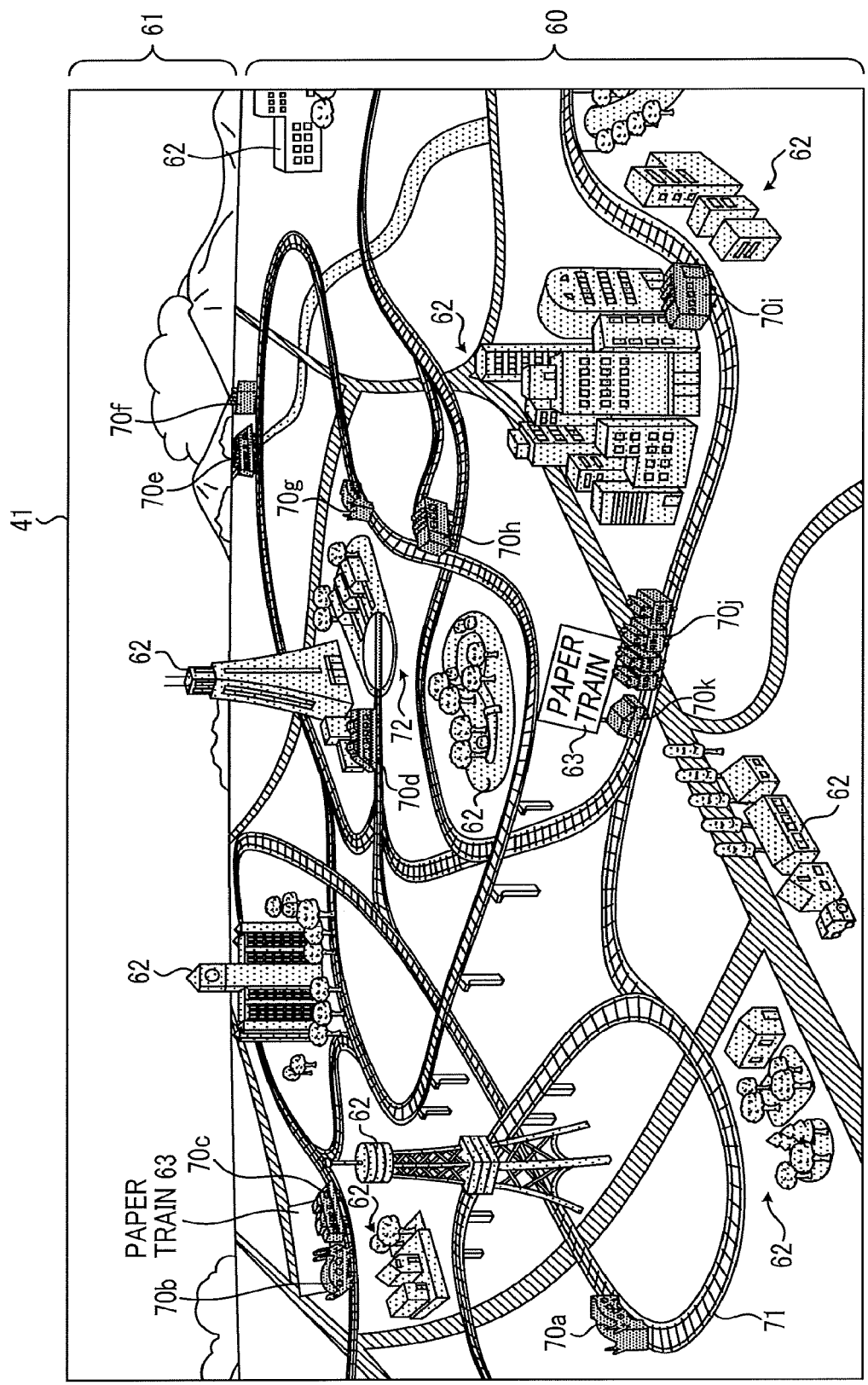
FIG. 5 is a schematic view illustrating one example of a projection image projected on a screen in the display system according to the one of the embodiments.

FIG. 5 is a schematic view illustrating the projection image 41 that is projected on a screen in the display system 1 according to the present embodiment. An example of the projection image 41 that is projected from the projector 11 is described below with reference to FIG. 5. In the example of FIG. 5, the projection image 41 is represented as an image formed with the projection images 41*a*, 41*b*, and 41*c* illustrated in FIG. 1 in a manner that each of the projection images 41*a*, 41*b*, and 41*c* has the overlapped area where the adjacent projection images are overlapped, at one or both sides.

In the display system 1 according to the present embodiment, the picture 31 drawn by the hand of the user 50 is made to be the three-dimensional object, and the three-dimensional image data space (particularly, the display area of the image data space) that includes the three-dimensional objects is projected as two-dimensional projection image data to be displayed as the projection image 41. A detailed description of this is deferred.

The three-dimensional object is a user object (train car object) that has a shape of a train car such as a car of an electronic railcar, a steam locomotive, an electric locomotive, etc., for example. A train, here, usually indicates a set of cars (which may be referred to as train cars here), but the train may include a single train car, namely the train is defined as a single train car or a set of train cars. Additionally, the user object corresponding to the drawing may include more than one train cars connected to each other. Each user 50 draws a train car freely in a predetermined area of the sheet of paper 30, which is to be a base of the train car object. The picture 31 representing the train car, which is freely drawn by the user 50, is three-dimensionally displayed to be arranged in the image data space as a train car object and displayed on the projection image 41. This allows the user 50 to watch an animation in which the train car drawn by the user 50 is three-dimensionally in, resulting in attracting the interests of the user 50.

In FIG. 5, a horizontal direction and a perpendicular direction of the projection image 41 are regarded as a direction of x-axis (x-axis direction) and a direction of y-axis (y-axis direction), respectively. The projection image 41 is divided into two in relation to the perpendicular direction, and a lower area is defined as a land area 60 representing a land and an upper area is defined as a sky area 61 representing the sky. A boundary between the land area 60 and the sky area 61 represents the horizontal line. The land area 60 represents a horizontal surface having depth from a lower end toward the horizontal line of the projection image 41. A detailed description of this is deferred. The land area 60 is mapped to image data representing, for example, a road, a grass land, and a river. Additionally, the sky area 61 represents a background including the sky, mountains, and clouds by mapping to image data representing the sky, the mountains, and the clouds at predetermined positions in the z-axis direction (depth direction).

As illustrated in FIG. 5, the railroad track object 71 on which the train car object travels is displayed to be arranged in the land area 60. The railroad track object 71 may be represented by mapping a two-dimensional image representing the entire railroad track to the land area 60, for example. In the example of FIG. 5, the railroad track has a crossing part that is raised. Accordingly, in such a case where the crossing part is, the railroad track object 71 may be generated by mapping two-dimensional images representing, for example, a rail and crosstie to a rail part, in relation to the raised part and a bridge pier supporting the raised part. Additionally, there are a plurality of train car objects 70*a* to 70*k* each of which is generated based on the corresponding picture 31 displayed to be arranged on the railroad track of the railroad track object 71. Each of the train car objects 70*a* to 70*k* is caused to travel on the railroad track of the railroad track object 71 according to the corresponding parameters. Hereinafter, the train car objects 70*a* to 70*k* may be simply referred to as the "train car object(s) 70" in referring to an arbitrary one of the train car objects 70*a* to 70*k* or referring collectively to the train car objects 70*a* to 70*k*.

Additionally, as illustrated in FIG. 5, the fixed objects 62 representing a house, a building, etc., the fixed objects 63 representing a signboard, and the start point object 72 that is a start point of the train car object 70 are fixedly arranged in the land area 60. As described above, data of the objects that are fixedly arranged, including the fixed objects 62 and 63, and the start point object 72, is stored in the background data folder 201 of the storage unit 113. By rewriting the data of the fixed objects 62 and 63, and the start point object 72, customization of the fixed objects arranged in the image data space may be achieved.

As described above, the display system 1 according to the present embodiment displays the train car object generated based on the picture 31 of the train car drawn by the hand of the user 50 and displays the moving train car object, namely the train car object travels on the railroad track of the railroad track object 71 in the projection image 41. This makes the user 50 feel exciting to imagine and expect, for example, how the three-dimensional structure of the picture 31 of the train car drawn by the user 50 looks like.

(Image Data Space and Display Area)

Figure 6A:
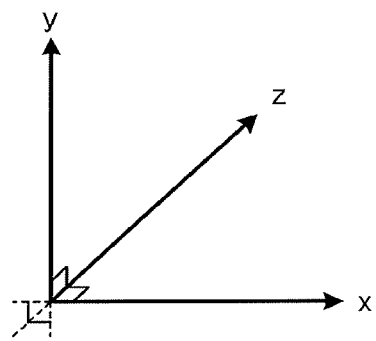
FIGS. 6A to 6C are illustrations of display areas each displayed as the projection image on the screen in the display system according to the one of the embodiments.
Figure 6B:
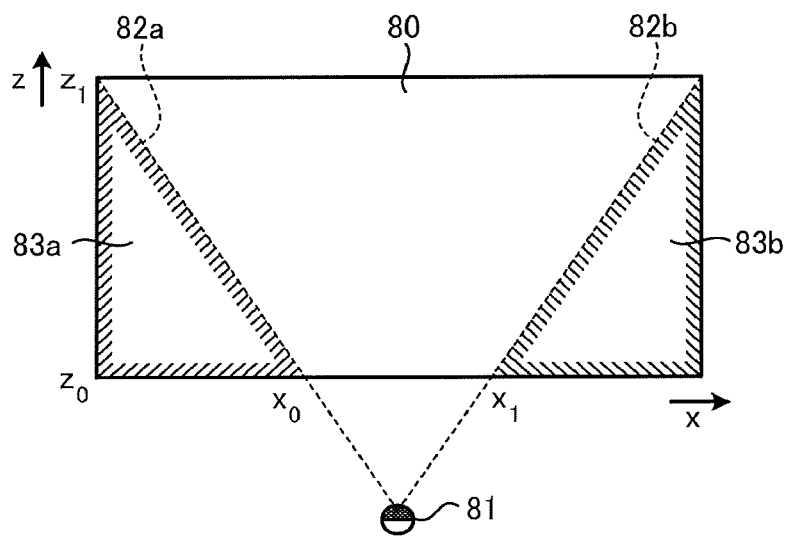
Figure 6C:
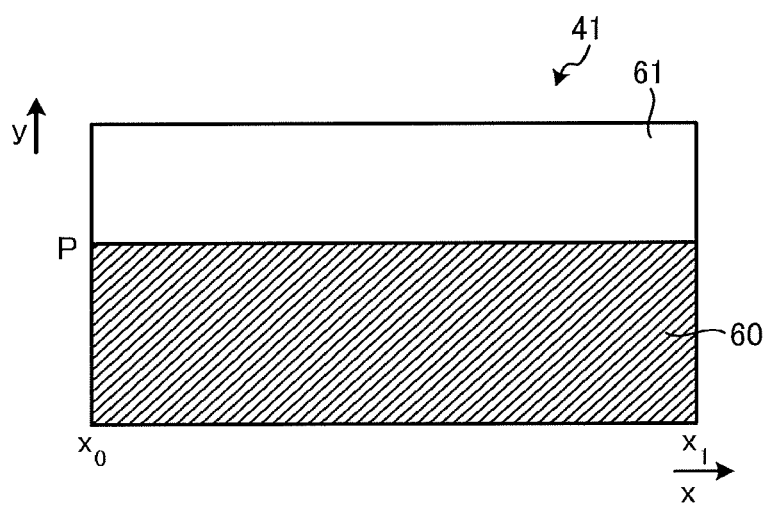

FIGS. 6A to 6C are illustrations of the display area displayed as a projection image on the screen in the display system 1 according to the present embodiment. The image data space and the display area are described with reference to FIGS. 6A to 6C.

In the example of FIGS. 6A to 6C, the display area is set in the three-dimensional image data space set by the display area setting unit 105 of the display controller 10. The image data space is a three-dimensional space represented by an x-axis, a y-axis, and a z-axis being orthogonal to each other, as illustrated in FIG. 6A, and a position in the space is represented with a coordinate (x, y, z). The x-axis corresponds to the horizontal direction, the y-axis corresponds to the perpendicular direction, and the z-axis corresponds to the depth direction.

The illustration of FIG. 6B is a horizontal plane of the image data space viewed from the z-axis direction, namely a plane surface of x and z (xz plane). In the example of FIG. 6B, a display area 80 is defined by a boundary line 82*a* that starts from a viewpoint 81 positioned in front of the image data space and crosses on the xz plane at a coordinate (x0, z0) to extend in the z direction in the image data space, and a boundary line 82b that starts from the viewpoint 81 and crosses on the xz plane at a coordinate (x1, z0) to extend in the z direction in the image data space. This display area 80 is an area that is displayed as the projection image 41.

Additionally, in the projection image 41, the depth direction (z-axis direction) is represented using perspective, and the deeper the death in a range from a coordinate z=z0 to a coordinate z=z1 is, the larger a display range in the x direction becomes. Additionally, areas in the image data space except for the display area 80, namely a hidden area 83a that is outside of the boundary line 82a in the image data space and a hidden area 83b that is outside of the boundary line 82b in the image data space, are defined as areas that are not to be displayed in the projection image 41.

In FIG. 6C, the x-axis direction (horizontal direction) and the y-axis direction (perpendicular direction) in the projection image 41 are illustrated. As the projection image 41, the entire display area 80 is displayed, as described above. In the example of FIG. 6C, each of the edges in the x-axis direction of the lower end in relation to the y-axis direction of the projection image 41 is corresponding to one of the coordinate x0 and the coordinate x1 in the x-axis direction of the image data space. The land area 60 is, for example, arranged at the lowest part in the image data space in relation to the y-axis direction, and is represented in an area that is lower than a position P in relation to the perpendicular direction in the projection image 41, in consideration of a position of the viewpoint 81 and a line of sight. The sky area 61 is represented in an area upper than the position P in relation to the perpendicular direction in the projection image 41, in consideration of the position of the viewpoint 81 and the line of sight.

The display area displayed as the projection image 41 in the image data space is variable by changing the position of the viewpoint 81 and a direction of the line of sight. For example, the position P in the projection image 41 illustrated in FIG. 6C is variable by changing the line of sight of the viewpoint 81, so that proportion of the land area 60 and the sky area 61 is also variable.

(Overall Configuration of Railroad Track)

Figure 7:
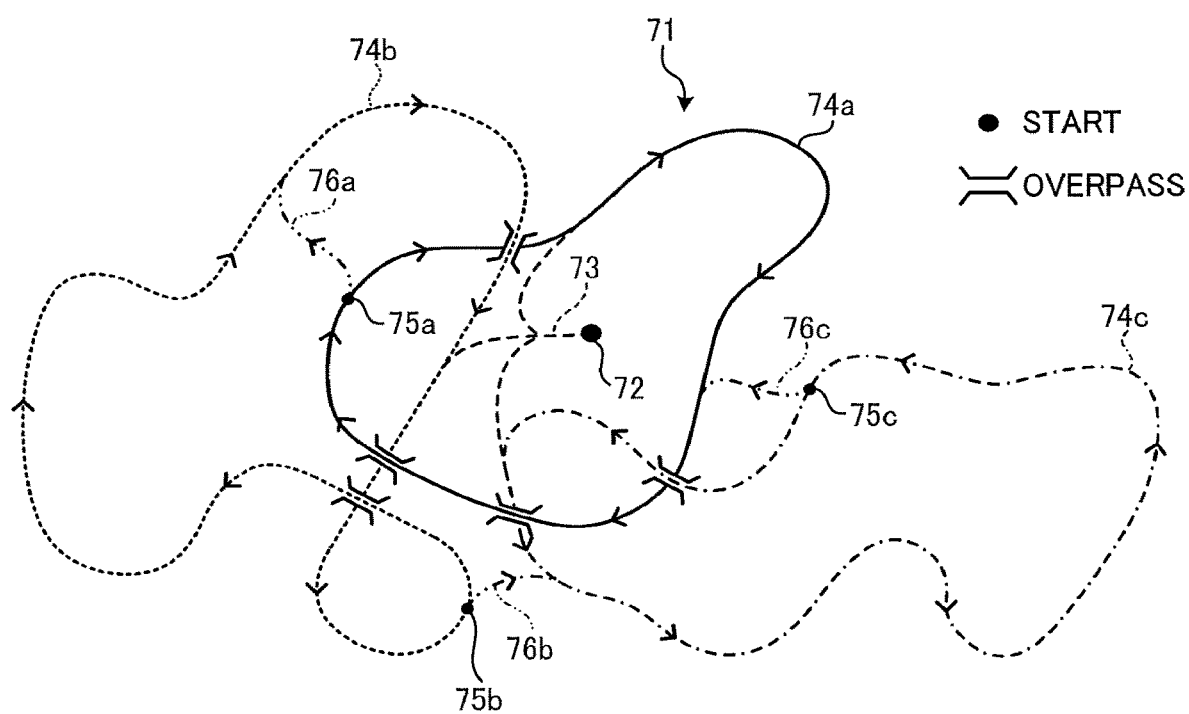
FIG. 7 is an illustration of a configuration of a railroad track on which a train car travels, or moves, in the display system according to the one of the embodiments.

FIG. 7 is an illustration of a configuration of the railroad track on which at least one train car travels, namely the at least one train car moves in the display system 1, according to the present embodiment. A description is given below of the overall configuration of a course of the railroad track represented with the railroad track object 71 with reference to FIG. 7.

The railroad track formed with the railroad track object 71 includes the start point represented with the start point object 72, a start railroad track 73, main railroad tracks 74a, 74b, and 74c, and spurs 76a, 76b, and 76c. Hereinafter, the main railroad tracks 74a, 74b, and 74c may be simply referred to as a "main railroad track(s) 74" in referring to an arbitrary one of the main railroad tracks 74a, 74b, and 74c or referring collectively to the main railroad tracks 74a, 74b, and 74c. Similarly, in case of referring to an arbitrary one of the spurs 76a, 76b, and 76c or referring collectively to the spurs 76a, 76b, and 76c, the spurs 76a, 76b, and 76c are simply referred to as the "spur(s) 76".

First, the train car object, which is generated and then made appear in the image data space, is placed at the start point represented with the start point object 72, as described later. The start railroad track 73 is a railroad track extended from the start point object 72 and diverges into three separate railroad tracks corresponding to the main railroad tracks 74a, 74b, and 74c. The train car object starts traveling from the start point to travel on the start railroad track 73 and randomly selects to take one of the main railroad tracks 74a, 74b, and 74c.

Each of the main railroad tracks 74a, 74b, and 74c is a loop railroad track, and the train car object basically travels repeatedly on the same one of the main railroad track 74a, 74b, or 74c to which the train car object takes. The main railroad track 74a has a fork 75a enabling the train car object to take the spur 76a that leads to the main railroad track 74b. The main railroad track 74b has a fork 75b enabling the train car object to take the spur 76b that leads to the main railroad track 74c. The main railroad track 74c has a fork 75c enabling the train car object to take the spur 76c that leads to the main railroad track 74a. The train car object traveling on the main railroad track 74 takes, at each of the forks 75a, 75b, and 75c, a corresponding one of the spurs 76a, 76b, and 76c, according to a condition for changing a course such as a rate of taking a spur (hereinafter, may be referred to as a spur-taking rate or course changing rate) included in the parameters, which is described later. Hereinafter, the forks 75a, 75b, and 75c may be simply referred to as a "fork(s) 75" in referring to an arbitrary one of the forks 75a, 75b, and 75c or referring collectively to the forks 75a, 75b, and 75c.

By changing a course from the current main railroad track 74 to different one of the main railroad tracks 74 at the fork 75 according to the spur-taking rate (course changing rate), the train car object travels while changing the course in order of the main railroad track 74a, the main railroad track 74b, the main railroad track 74c, the main railroad track 74b, . . . as a whole.

The course of the railroad track represented with the railroad track object 71 illustrated in FIG. 7 is one example, and the embodiments are not limited to this. In one or more embodiments, the number of the main railroad tracks 74 may be more or less than that of the present embodiment, and/or the spur 76 from one of the main railroad tracks 74 to lead to different one of the main railroad tracks 74, namely to change the course, may be more than one. In the course illustrated in FIG. 7, each of the main railroad tracks 74 is illustrated as a single track, however the embodiments are not limited to this and a double track may be used for the main railroad tracks 74.

Additionally, in the description of the present embodiment above, the train car object starts traveling on the start railroad track 73 from the start point, selects randomly to take one of the three different railroad tracks at the fork, and then takes one of the main railroad tracks 74a, 74b, and 74c, however, this is not limiting the embodiments. That is, a rate of taking each main railroad track 74 may be corresponding to rate of a length of each of the main railroad tracks 74a, 74b, and 74c. For example, when the rate of the length of the three main railroad tracks 74 is 1:2:3, the rate with which the train car object takes the respective main railroad tracks 74 are ⅙, 2/6(⅓), and 3/6(½). Assigning the rate of taking each of the main railroad tracks 74 according to the length of the main railroad tracks 74 prevents a specific one of the main railroad tracks 74 from being converged with the train car objects unevenly.

(Process of Reading Original Drawing)

Figure 8:
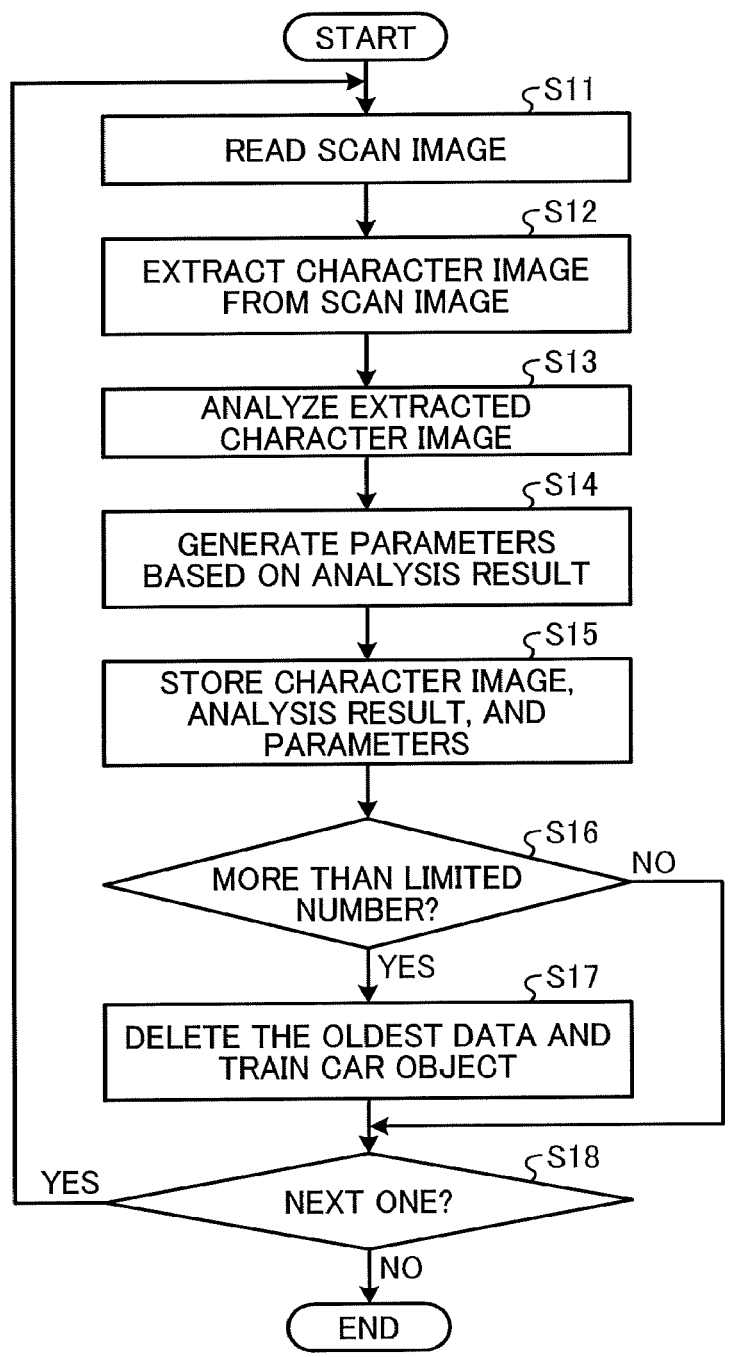
FIG. 8 is a flowchart illustrating a process of reading an original drawing in the display system according to the one of the embodiments.
Figure 9:
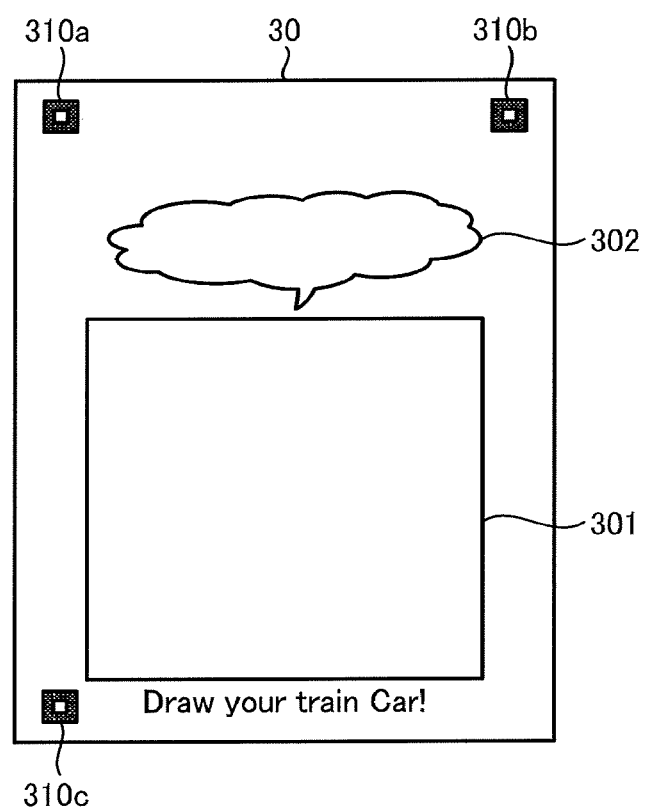
FIG. 9 is an illustration of one example of a sheet of paper used for drawing a picture by hand in the display system according to the one of the embodiments.
Figure 10A:
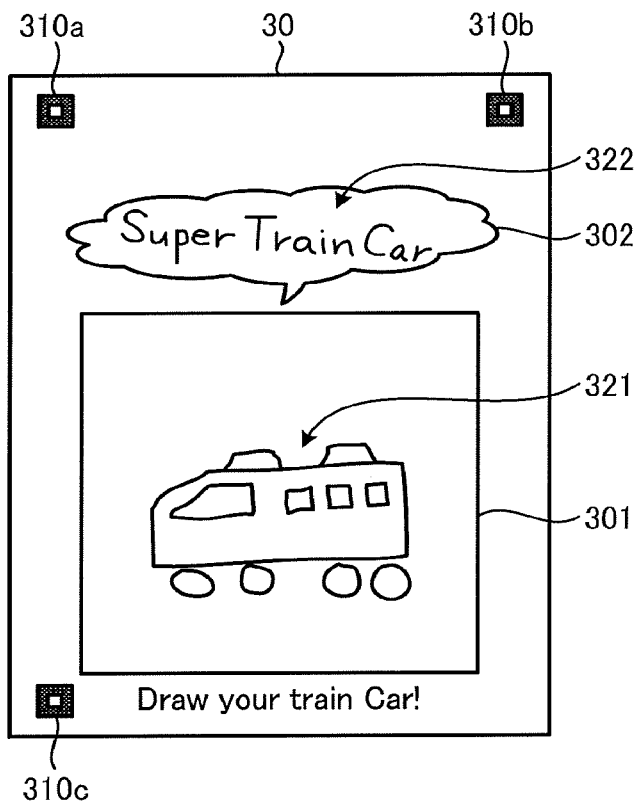
FIG. 10A is an illustration of one example state where a picture is drawn in the sheet of paper used in the display system according to the one of the embodiments.
Figure 10B:
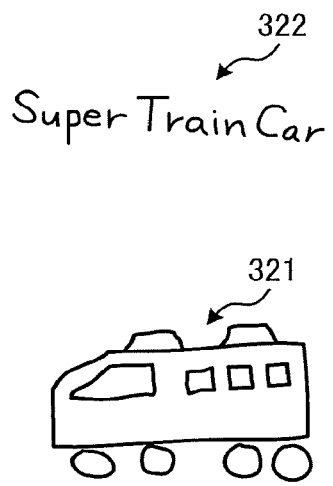
FIG. 10B is an illustration of a character image and a title image extracted.
Figure 11:
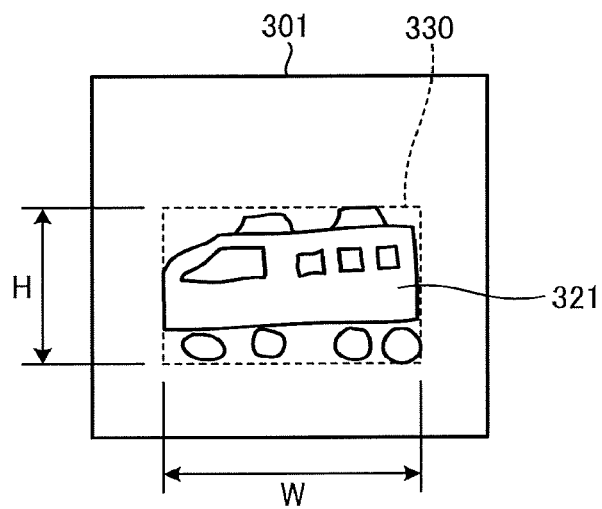
FIG. 11 is an illustration of the character image extracted, indicating an aspect ratio of the character image.

FIG. 8 is a flowchart illustrating a process of reading an original drawing in the display system 1 according to the present embodiment. FIG. 9 is an illustration of an example of the sheet of paper 30 used for drawing by the hand in the display system 1 according to the embodiment. FIG. 10A is an illustration of an example of the sheet of paper 30 on which an example picture, that is a character image 321, is drawn within a drawing area 301, and used for drawing by the hand in the display system 1 according to the embodiment. FIG. 11 is an illustration of an example of the character image 321, which is extracted, indicating an aspect ratio of the character image 321. A description is given of the process of reading the original drawing in the display system 1 according to the present embodiment with reference to FIGS. 8 to 11. The following assumes that a picture of a train car is drawn by the hand of the user 50 before the process of reading the original drawing is performed. Additionally, the sheet of paper 30, which is dedicated to the display system 1 may be provided to the user 50 by a service provider who provides this service using the display system 1.

Referring to FIG. 9, the sheet of paper 30 includes a title area 302 in which a title of the train car drawn by the user 50 is written, and the drawing area 301 in which the user 50 draws the train car. Markers 310*a*, 310*b*, and 310*c* are individually assigned at three corners out of the four corners of the sheet of paper 30. The markers 310*a*, 310*b*, and 310*c* are used to specify an orientation and a size of the sheet of paper 30, and to specify a position and a size of each of the drawing area 301 and the title area 302. The positions of the drawing area 301 and the title area 302 are determined in advance in relation to positions of the markers 310*a*, 310*b*, and 310*c* in the sheet of paper 30.

FIG. 10A illustrates the sheet of paper 30 including the character image 321 drawn in the drawing area 301, and the title image 322 written in the title area 302.

<Step S11>

The scanner 20 reads the sheet of paper 30 on which the character image 321 and the title image 322 are drawn to obtain image data. The image acquisition unit 101 of the display controller 10 receives and acquires the image data from the scanner 20 via the communication unit 118 as a scan image (user image). The image acquisition unit 101 causes the storage unit 113 to store the acquired scan image in the scan image folder 202. The process, subsequently, proceeds to S12.

<Step S12>

The extraction unit 102 of the display controller 10 extracts from the scan image acquired by the image acquisition unit 101, the character image 321 that is drawn in the drawing area 301, and the title image 322 that is written in the title area 302.

More specifically, the extraction unit 102 detects each of the markers 310*a*, 310*b*, and 310*c* from the scan image using pattern matching, for example. By detecting the markers 310*a*, 310*b*, and 310*c* as described above, the orientation and the size of the sheet of paper 30 are specified, and the position and the size corresponding to each of the drawing area 301 and the title area 302 in the scan image are also specified. Subsequently, the extraction unit 102 extracts a corresponding part of the character image 321 by binaraizing an image corresponding to the drawing area 301 in the scan image, according to whether a pixel of the image is white (base color of the sheet of paper 30) or other color than the white. This binarization also applies to the extraction of the title image 322. FIG. 10B illustrates the character image 321 and the title image 322 extracted from the drawing area 301 and the title area 302, respectively, by the extraction unit 102.

The extraction unit 102 transmits the character image 321 and the title image 322 to the parameter generating unit 103. Subsequently, the process proceeds to S13.

<Step S13>

The parameter generating unit 103 of the display controller 10 analyzes the character image 321 received from the extraction unit 102.

The parameter generating unit 103 defines a rectangle area 330 that is an area including the character image 321, and having a rectangular shape in a manner that a bottom side of the rectangle area 330 is parallel to a bottom side of the drawing area 301 as illustrated in FIG. 11. Additionally, each side of the rectangle area 330 contacts with the character image 321, as illustrated in FIG. 11. The parameter generating unit 103 calculates an aspect ratio (=height/width (H/W)) of the rectangle area 330 as a feature value. The parameter generating unit 103 also obtains other feature values each of which indicates one of color saturation, an index value of color profile, and an index value of edge distribution of the character image 321.

Subsequently, the process proceeds to S14.

<Step S14>

The parameter generating unit 103 generates the parameters each of which defines a corresponding movement of the train car object corresponding to the character image 321 based on the corresponding feature value, which is the analysis result.

More specifically, the parameter generating unit 103 generates one of the parameters defining a default speed (fixed speed) of the train car object, which has three-dimensional structure (three-dimensional train car object) of the character image 321, based on the feature value of the aspect ratio corresponding to the character image 321. For example, the parameter generating unit 103 may generate the parameter defining the fixed speed in a manner that the smaller the aspect ratio is (the horizontally longer the character image 321 is), the higher the fixed speed becomes. Additionally, the parameter generating unit 103 generates the parameter defining a coupling rate, which is one example of condition for coupling to another train car object, of the three-dimensional train car object of the character image 321 based on the color saturation which is one of the feature values. For example, the parameter generating unit 103 generates the parameter in a manner that the higher the color saturation is, the higher the coupling rate becomes. Additionally, the parameter generating unit 103 generates the parameter defining the course changing rate, or spur-taking rate, of the three-dimensional train car object of the character image 321 based on the index value indicating the feature value of the color profile. For example, the larger the index value is, the more the number of the colors used in the character image 321 is to become, and the parameter generating unit 103 may generate the parameter in a manner that the larger the index value of the color profile is, the higher the course changing rate, or the spur-taking rate, of the parameter becomes. Additionally, the parameter generating unit 103 generates the parameter defining a speed-decreasing rate of the three-dimensional train car object of the character image 321 based on the index value indicating the feature value of the edge distribution. For example, the larger the index value is, the sharper an edge of the shape configuring as the character image 321 is to become, and the parameter generating unit 103 may generate the parameter in a manner that the larger the index value of the edge distribution is, the higher the speed-decreasing rate of the parameter becomes.

The feature values obtained and the parameters generated by the parameter generating unit 103 described above are not limiting the embodiments and any other feature values may be used to generate any other parameters. For example, the parameter generating unit 103 may generate a speed-increasing rate of the train car object as a parameter based on a specified feature value.

Subsequently, the process proceeds to S15.

<Step S15>

The extraction unit 102 causes the storage unit 113 to store the extracted character image 321 and the title image 322 in the character image folder 203 and database folder 204, respectively. The parameter generating unit 103 causes the storage unit 113 to store the analysis result information, including each of the obtained feature values and the generated parameters, in each of the character image folder 203 and database folder 204 in association with the character image 321 and the title image 322. Subsequently, the process proceeds to S16.

<Step S16>

The parameter generating unit 103 determines whether the number of data groups including the character image, the title image, the analysis result information and the parameters stored in the character image folder 203 exceeds the display limited number indicated with the display limited number information stored in the storage unit 113 or not. When the number of data groups exceeds the display limited number (S16: YES), the process proceeds to S17. On the other hand, when then number of data groups is equal to or less than the limited number (S16: NO), the process proceeds to S18.

<Step S17>

The parameter generating unit 103 deletes a data group corresponding to the oldest train car object from the data groups each of which includes the character image, the title image, the analysis result information and the parameters stored in the character image folder 203. Further, the object generating unit 106 deletes, from the image data space, the train car object corresponds to the data group deleted from the character image folder 203.

Additionally, a time when the oldest train car object is deleted from the image data space is not limited to a time immediately after the various data corresponding to the train car object stored in the character image folder 203 is deleted. For example, in one or some embodiments, the train car object may be deleted after being moved to an area other than display area 80 in the image data space, namely the hidden area 83a or 83b, instead of being deleted during being in the display area 80, when the train car object is determined to be deleted. This decreases uncomfortable feeling that may occur in the user 50 because of the sudden loss of the train car object from the image data space, and achieves replacement between the train car objects in a natural way. Subsequently, the process proceeds to S18.

<Step S18>

When there is a next one of the sheet of papers 30 to be read by the scanner 20, the process returns to S11. On the other hand, when there is no more sheet of paper 30 to be read by the scanner 20, the process is completed.

As described above, through S11 to S18, the process of reading the original drawing is performed.

(Process of Causing Character Image to Appear)

FIGS. 12A to 12D are illustrations of the projection images, describing a process of causing the character image to appear in the projection image. A detailed description is given of the process of causing the character image (the train car object based on the character image) to appear in the projection image 41 with reference to FIGS. 12A to 12D. For easy understanding, the other objects than the start point object 72 are omitted in the projection image 41 illustrated in FIGS. 12A to 12D.

Figure 12A:
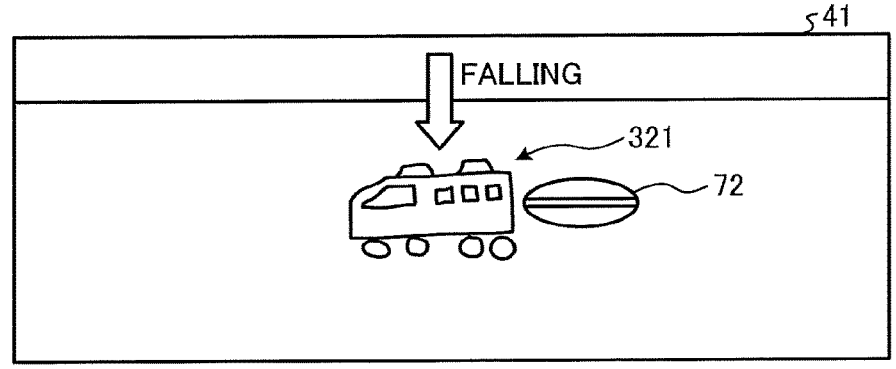
FIGS. 12A to 12D are illustrations of the projection images, each illustrating how the character image appears in the projection image.

When the character image 321 is newly stored in the character image folder 203 in the process of reading the original drawing as described above, the object generating unit 106 of the display controller 10 reads the character image 321 from the character image folder 203. The object generating unit 106 arranges the read character image 321 in the image data space in a manner that the character image 321 appears on the projection image 41 from an upper side of the display area 80 of the image data space, namely the character image 321 falls from the upper side. As illustrated in FIG. 12A, the character image 321 drawn by the user 50 falls and appears in the projection image 41.

Figure 12B:
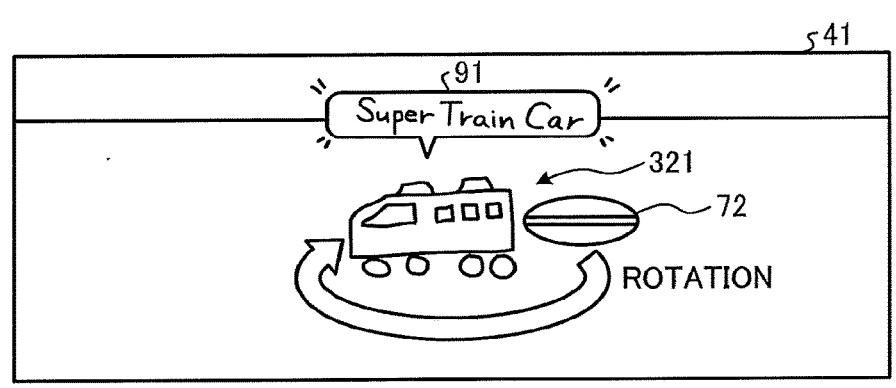

After causing the character image 321 to fall to a predetermined position, in the display area 80, the object generating unit 106 rotates the character image 321 as illustrated in FIG. 12B, and displays, above the character image 321, a balloon object 91 mapped to the title image 322, which corresponds to the character image 321. In the example of FIG. 12B, the balloon object 91 is mapped to the title image 322 in which "Super Train Car" is written.

Figure 12C:
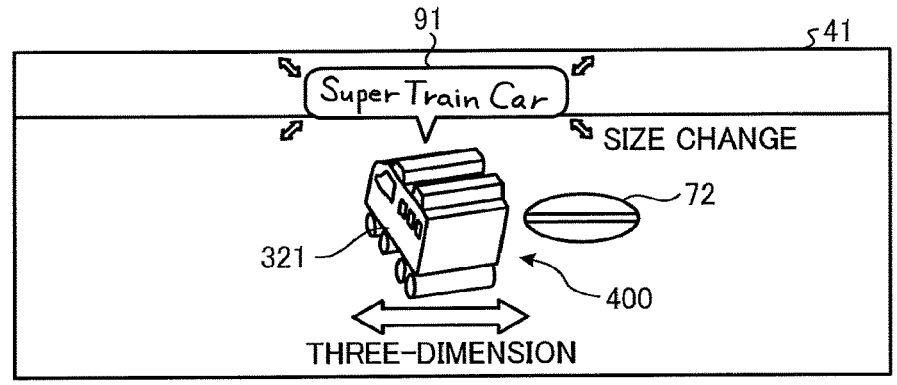

Referring to FIG. 12C, the object generating unit 106, subsequently, stretches the character image 321 in a perpendicular direction in relation to an image surface while rotating the character image 321 to make the image become three-dimensional, resulting in a train car object 400 of FIG. 12C. The object generating unit 106 may map an image obtained by inverting the character image 321 laterally to an opposite side of the stretched character image 321. At this time, a stretched length obtained by stretching the character image 321 by the object generating unit 106 may be substantially the same as a width of the railroad track of the railroad track object 71. Additionally, the object generating unit 106 repeats increasing and decreasing the size of the balloon object 91 while the character image 321 (train car object 400) is rotating and becoming three-dimensional. This enables the user 50 to watch a process in which the picture of the train car drawn by the user 50 appears on the projection image 41 and becomes the three-dimensional train car object, and attracts the interest of the user 50.

Figure 12D:
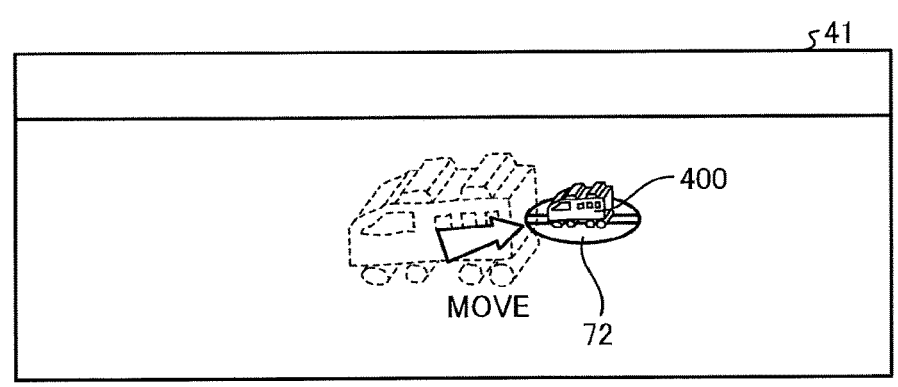

The object generating unit 106 erases the balloon object 91 as illustrated in FIG. 12D after a predetermined time has passed since the train car object 400 is generated, and causes the train car object 400 to move and place at the start point object 72 arranged in the land area 60. At this time, the train car object 400, which is moved and placed at the start point object 72, is displayed so as to be smaller than the size of the train car object 400 at an original place, because a position where the start point object 72 is arranged in the z-axis direction is behind of the position where the character image 321 appears in the z-axis direction (depth direction), as illustrated in FIG. 12D.

The movement control unit 107 of the display controller 10 causes the train car object 400 to start moving to travel on the start railroad track 73 (see FIG. 7), after the train car object 400 is arranged at the start point object 72. The condition determination unit 109 of the display controller 10 determines to select one of the three railroad tracks randomly, when determining that the train car object 400 comes at the fork, at which the railroad diverges into the three railroad tracks, of the start railroad track 73. The movement control unit 107 causes the train car object 400 to travel, namely move forward, on one of the three railroad tracks of the start railroad track 73 determined by the condition determination unit 109 to take the corresponding main railroad track 74.

As described above, the character image 321 obtained based on the picture of the train drawn by the user 50 appears on the projection image 41 and becomes three-dimensional.

(Process of Controlling Train Car Object in Moving)

Figure 13:
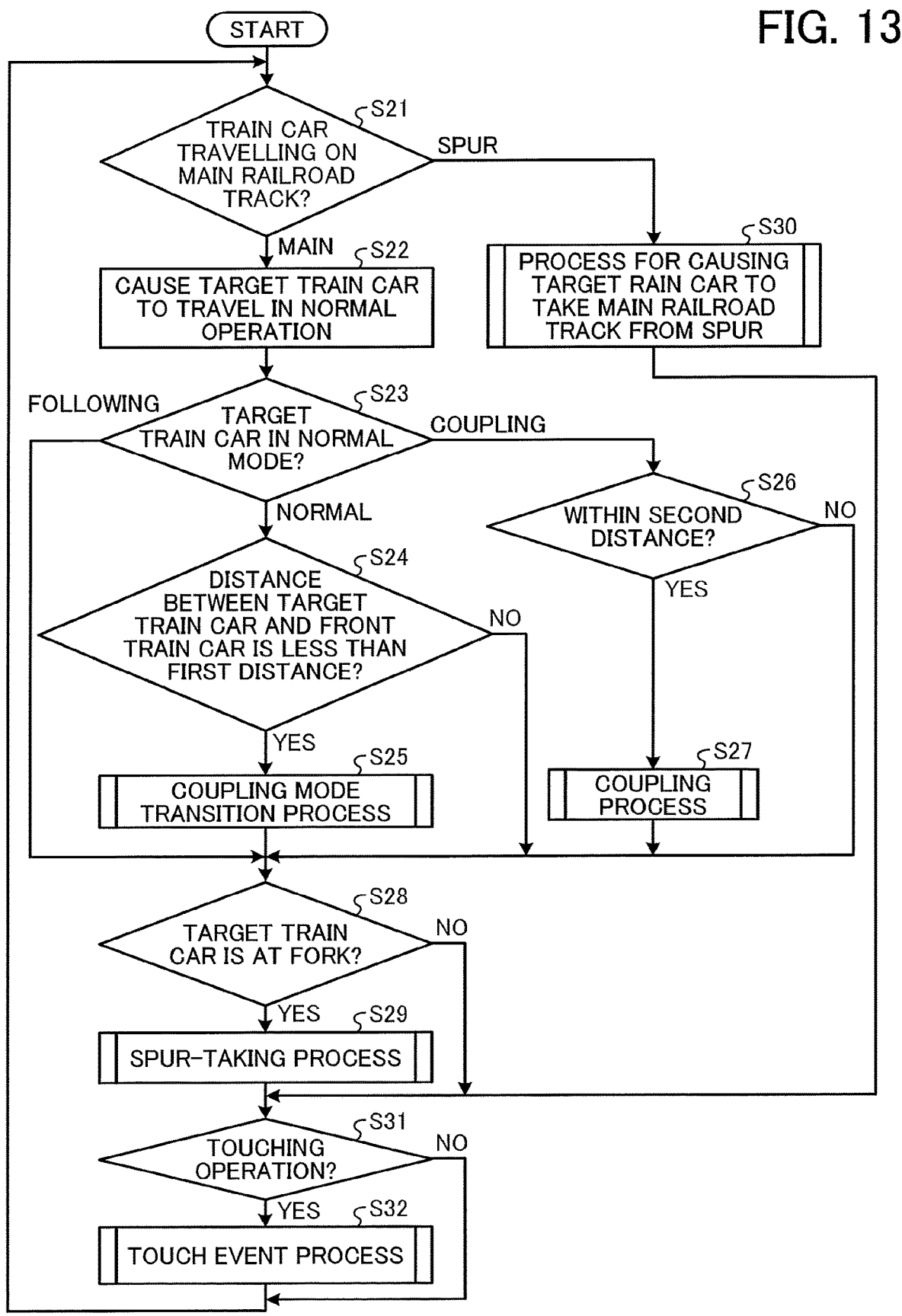
FIG. 13 is a flowchart illustrating a process of controlling a train car object in moving in a display area of the display system according to the one of the embodiments.

FIG. 13 is a flowchart illustrating a process of controlling the train car object in moving in the display area of the display system 1 according to the present embodiment. A description is given below of the process of controlling the train car object in the display system 1 according to the present embodiment with reference to FIG. 13. The process of controlling the train car object in moving described here is related to the movement of the train car object after being generated and taking one of the main railroad tracks 74 from the start railroad track 73. This process may be referred to as a movement control process. Additionally, the train car object that is a target to be controlled by the movement control process is simply referred to as a "target train car" (first user object).

<Step S21>

The condition determination unit 109 of the display controller 10 determines whether the target train car is on the main railroad track 74 or the spur 76. When the target train car is on the main railroad track 74 (S21: MAIN), the process proceeds to S22. On the other hand, the target train car is on the spur 76 (S21: SPUR), the process proceeds to S30.

<Step S22>

The movement control unit 107 of the display controller 10 performs normal movement control when the target train car is on the main railroad track 74. For example, the movement control unit 107 causes the target train car to travel, or move forward, on a lineally arranged part of the main railroad track 74 at a fixed speed according to the parameter associated with the target train car. Additionally, the movement control unit 107 causes the target train car to decrease the speed when the target train car approaches a curve on the main railroad track 74, and increase the speed when the target train car comes at an end of the curve. The movement control unit 107 further causes the target train car to decrease the speed when the target train car approaches an ascending slope on the main railroad track 74, and increase the speed when the target train car comes at an end of the ascending slope. The movement control unit 107 further causes the target train car to increase the speed when the target train car approaches a descending slope on the main railroad track 74, and increase the speed when the target train car is comes an end of the descending slope. The movements of the train car described above are examples of the movements under the normal movement control and invokes the user 50 to imagine the operation of an actual train, however the embodiments are not limited to this and any other movements of the target train car may be performed. Subsequently, the process proceeds to S23.

<Step S23>

The condition determination unit 109 determines which movement mode the target train car is currently in. When the movement mode is the normal mode (S 23: NORMAL), the process proceeds to S24. When the movement mode is the coupling mode (S23: COUPLING), the process proceeds to S26, and when the movement mode is the following mode (S23: FOLLOWING), the process proceeds to S28.

<Step S24>

The condition determination unit 109 determines whether a distance between the target train car being in the normal mode and another train car object traveling in front of the target train car (hereinafter, simply referred to as a "front train car") (second user object) is less than a first distance. The first distance is a distance assigned to the train car object of the target train car being in the normal mode, and is determined according to the coupling rate that is one of the parameters associated with the train car object of the target train car. For example, the first distance may be obtained by multiplying a reference distance with the coupling rate. When the distance is less than the first distance (S24: YES), the process proceeds to S25. On the other hand, the distance is more than the first distance (S24: NO), the process proceeds to S28.

<Step S25>

The display controller 10 performs a process of causing the target train car to transition from the normal mode to the coupling mode. This process may be referred to as a coupling mode transition process. The process of causing the train car to transition to the coupling mode is described later in detail with reference to FIG. 14 and FIG. 15. Subsequently, the process proceeds to S28.

<Step S26>

The condition determination unit 109 determines whether the distance between the target train car being in the coupling mode and the front train car is equal to or less than a second distance. The second distance is a distance assigned to the target train car object being in the coupling mode, and is determined according to the coupling rate that is one of the parameters associated with the train car object of the target train car. For example, the second distance may be obtained by multiplying a distance obtained randomly with the coupling rate. When the distance is within the second distance (S26: YES), the process proceeds to S27. On the other hand, the distance is equal to or more than the second distance (S26: NO), the process proceeds to S28.

<Step S27>

The display controller 10 causes the target train car to couple with, or connect to, the front train car, namely the target train car and the front train care are joined together as a train, which is defined, here, as one of or a set of train cars. The process of causing the target train car to couple with, or connect to, the front train car, which may be referred to as a coupling process, is described later in detail with reference to FIGS. 16 to 18. Subsequently, the process proceeds to S28.

<Step S28>

The condition determination unit 109 determines whether the target train car is at the fork 75 on the main railroad track 74 or not. When the target train car is at the fork 75 (S28: YES), the process proceeds to S29. On the other hand, when the target train car is not at the fork 75 (S28: NO), the process proceeds to S31.

<Step S29>

Figure 19A:
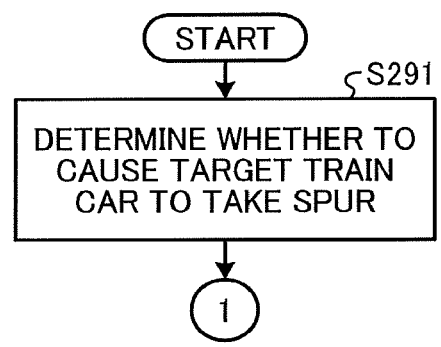
FIG. 19 (FIGS. 19A and 19B) is a flowchart illustrating a process including a process of determining whether to cause a train car to take a spur and a subsequent process in the display area of the display system according to the one of the embodiment.
Figure 19B:
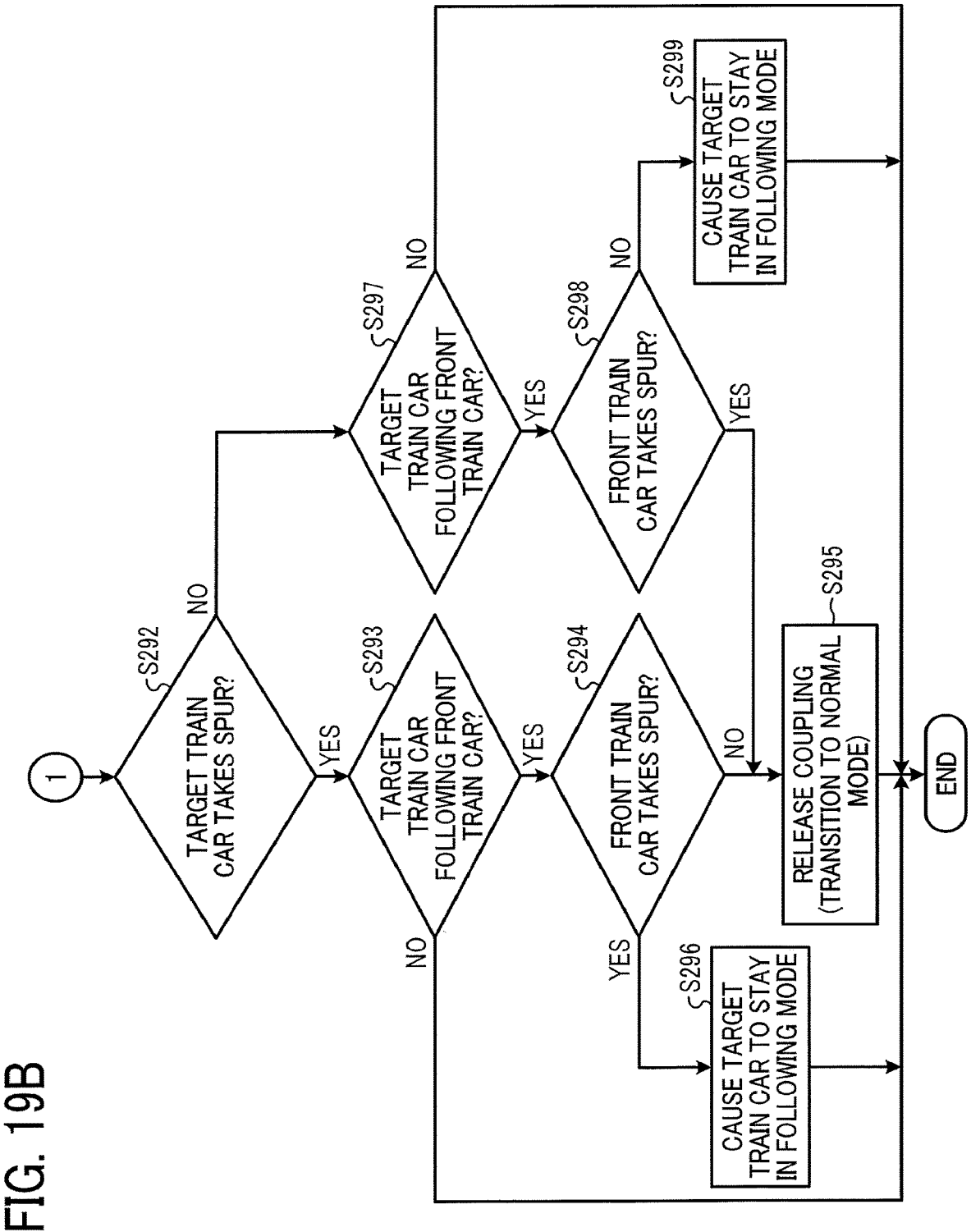

The display controller 10 determines whether to cause the target train car to change the course, namely to take the spur 76, or not. The process of causing the target train car to take the spur 76 and a process subsequent to the determination is described later in detail with reference to FIG. 19 (FIGS. 19A and 19B). This process and the subsequent process are collectively referred to as a spur-taking process, or a course changing process, here. Subsequently, the process proceeds to S31.

<Step S30>

The display controller 10 performs a process of causing the target train car to take the main railroad track 74 from the spur 76 smoothly. The process of causing the target train car to take the main railroad track 74 from the spur 76 is described later in detail with reference to FIGS. 20 and 21.

<Step S31>

The condition determination unit 109 determines whether the user 50 performs the touching operation or not. More specifically, condition determination unit 109 determines whether there is the touching operation according to information indicating whether position information is input from the area sensor 13 using the input unit 111. When there is the touching operation (S31: YES), the process proceeds to S32. On the other hand, when there is no touching operation (S31: NO), the process returns to S21 to repeat the movement control process.

<Step S32>

The display controller 10 performs a touch event process that is a process in which one or more actions are performed in relation to the target train car when the user touches the target train car. The touch event process is described later in detail with reference to FIGS. 24 and 25. Then, the process returns to S21 to repeat the movement control process.

As described above, through S21 to S32, the movement control process is performed.

(Coupling Mode Transition Process)

Figure 14:
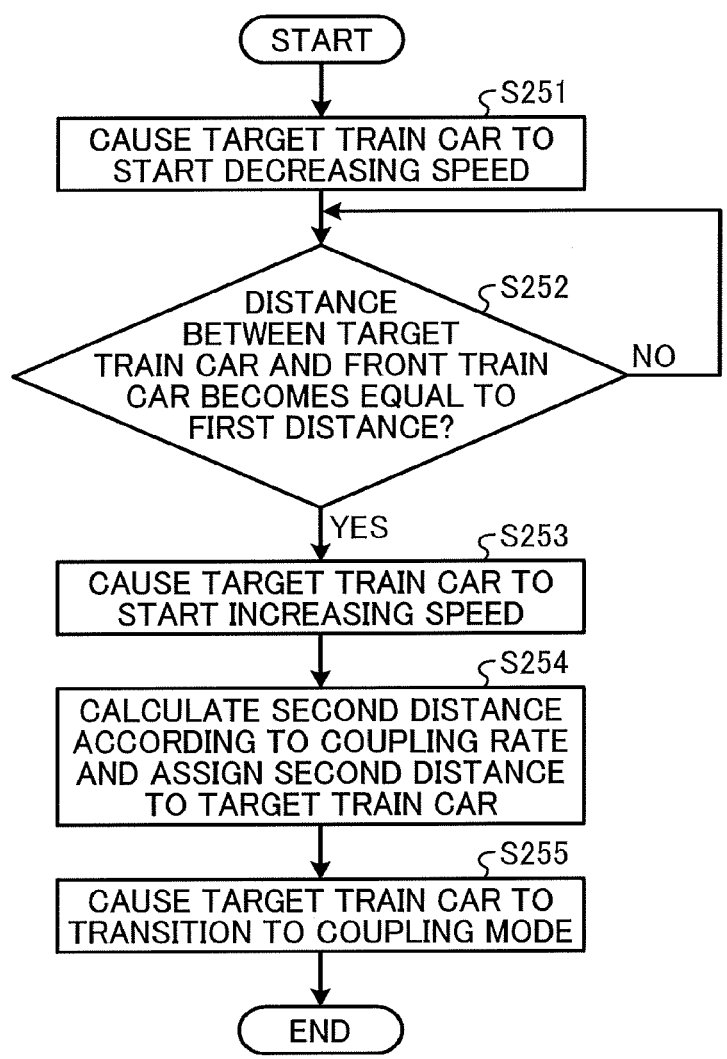
FIG. 14 is a flowchart illustrating a process of causing the train car to transition to a coupling mode in the display area in the display system according to the one of the embodiments.

FIG. 14 is a flowchart illustrating the coupling mode transition process that is a process of causing the train car object to transition to a coupling mode in the display area of the display system 1 according to the present embodiment. FIGS. 15A to 15D are illustrations of the objects for illustrating the coupling mode transition process in the display area of the display system 1 according to the present embodiment. A description is given of the coupling mode transition process, which is S25 of FIG. 13, performed by the display controller 10 of the display system 1 with reference to FIGS. 14 and 15.

<Step S251>

The movement control unit 107 of the display controller 10 causing the target train car being in the normal mode and moving at the fixed speed to start decreasing the speed according to a speed-decreasing rate that is one of the parameters associated with the train car object, when the distance between the target train car and the front train car is less than the first distance.

In the description of the coupling mode transition process and in FIG. 15A to FIG. 15D, as an example of the target train car (first user object), a first train car 402 is used, and as an example of the front train car (second user object), a second train car 401 is used.

Figure 15A:
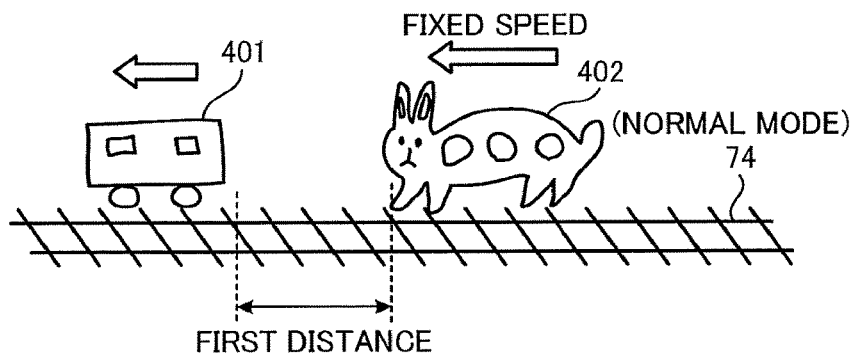
FIGS. 15A to 15D are illustrations of objects, illustrating the process of causing the train car object to transition to the coupling mode in the display area of the display system according to the one of the embodiments.
Figure 15B:
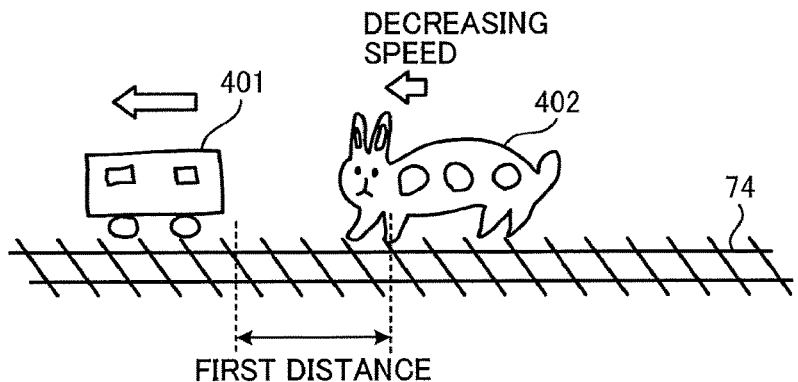

For example, as illustrated in FIG. 15A, when the target train car, which is the first train car 402 in FIG. 15A, being in the normal mode and moving at the fixed speed on the main railroad track 74, the condition determination unit 109 determines that the distance between the first train car 402 and the front train car, which is the second train car 401 in FIG. 15A, is less than the first distance. According to the determination, the movement control unit 107 causes the first train car 402 to start decreasing the speed, as illustrated in FIG. 15B.

Subsequently, the process proceeds to S252.

<Step S252>

The condition determination unit 109 of the display controller 10 determines whether the distance between the target train car (the first train car 402) and the front train car, (the second train car 401) becomes equal to the first distance due to the decrease of the speed of the target train car (the first train car 402). When the distance becomes equal to the first distance (S252: YES), the process proceeds to S253. On the other hand, the distance is still less than the first distance (S252: NO), the movement control unit 107 keeps causing the target train car (the first train car 402), to decrease the speed and performs S252 again.

<Step S253>

Figure 15C:
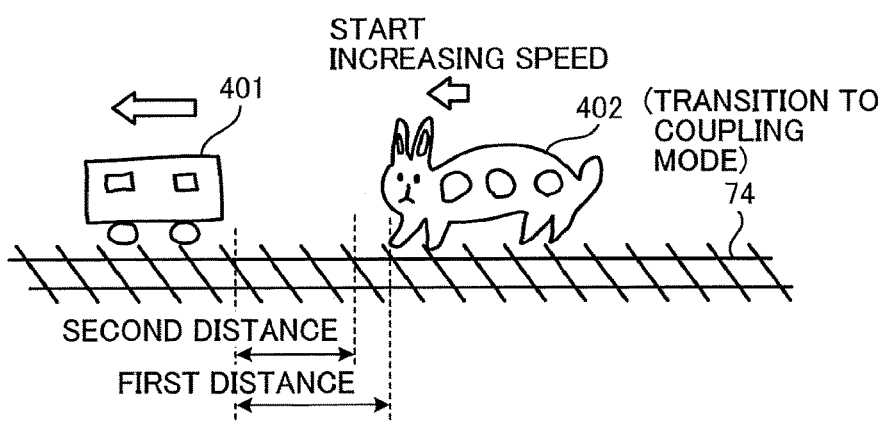
Figure 15D:
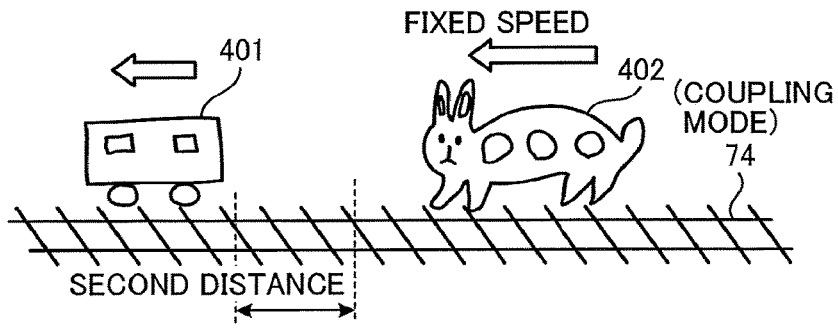

The movement control unit 107 causes the target train car to start increasing the speed when the condition determination unit 109 determines that the distance between the target train car and the front train car becomes equal to the first distance. For example, as illustrated in FIG. 15C, the movement control unit 107 causes the first train car 402 to increase the speed when the condition determination unit 109 determines the distance between the first train car 402 and the second train car 401, which is the front train car, becomes equal to the first distance. Subsequently, the process proceeds to S254.

<Step S254>

When the target train car (the first train car 402) starts increasing the speed, the mode management unit 108 calculates the second distance according to the coupling rate that is one of the parameters associated with the target train car (the first train car 402) and assigns the second distance to the target train car (the first train car 402) (see FIG. 15C). The process proceeds to S255.

<Step S255>

When the second distance is assigned to the target train car (the first train car 402) the mode management unit 108 causes the target train car (the first train car 402) to transition from the normal mode to the coupling mode (see FIG. 15C). The movement control unit 107 keeps causing the target train car (the first train car 402) to increase the speed to the fixed speed (see FIG. 15D). Thus, the coupling mode transition process is completed.

Through S251 to S255, the coupling mode transition process is performed. As described above, the target train car (first train car 402) being in the normal mode transitions to the coupling mode in which the target train car (first train car 402) is connectable to, or ready to couple with, the front train car (second train car 401), after decreasing the speed once to make an enough distance from the front train car (second train car 401) instead of going straight to couple with the front train car (second train car 401). This avoids a situation of heavy traffic, which may be caused because the train car objects are continuously displayed to be arranged in the display area 80 and each of the train car objects is coupled with another one in front, one after another, resulting in trains each including a set of train cars joined together traveling and no single train traveling.

On transitioning to the coupling mode, the target train car (first train car 402) enters in a state to be ready to couple with the front train car (second train car 401) at any time when the target train car (first train car 402) is in proximity to the front train car next time (but the number of train cars joined together is limited equal to or less than five, here). In one or more embodiments, the coupling mode may stay for a certain period and then transitions to the normal mode after the certain period has passed. Alternatively, the movement mode may transition from the coupling mode to the normal mode when the train car being in the coupling mode changes the course, namely takes other one of the main railroad tracks 74 at the fork 75.

(Coupling Process)

Figure 16:
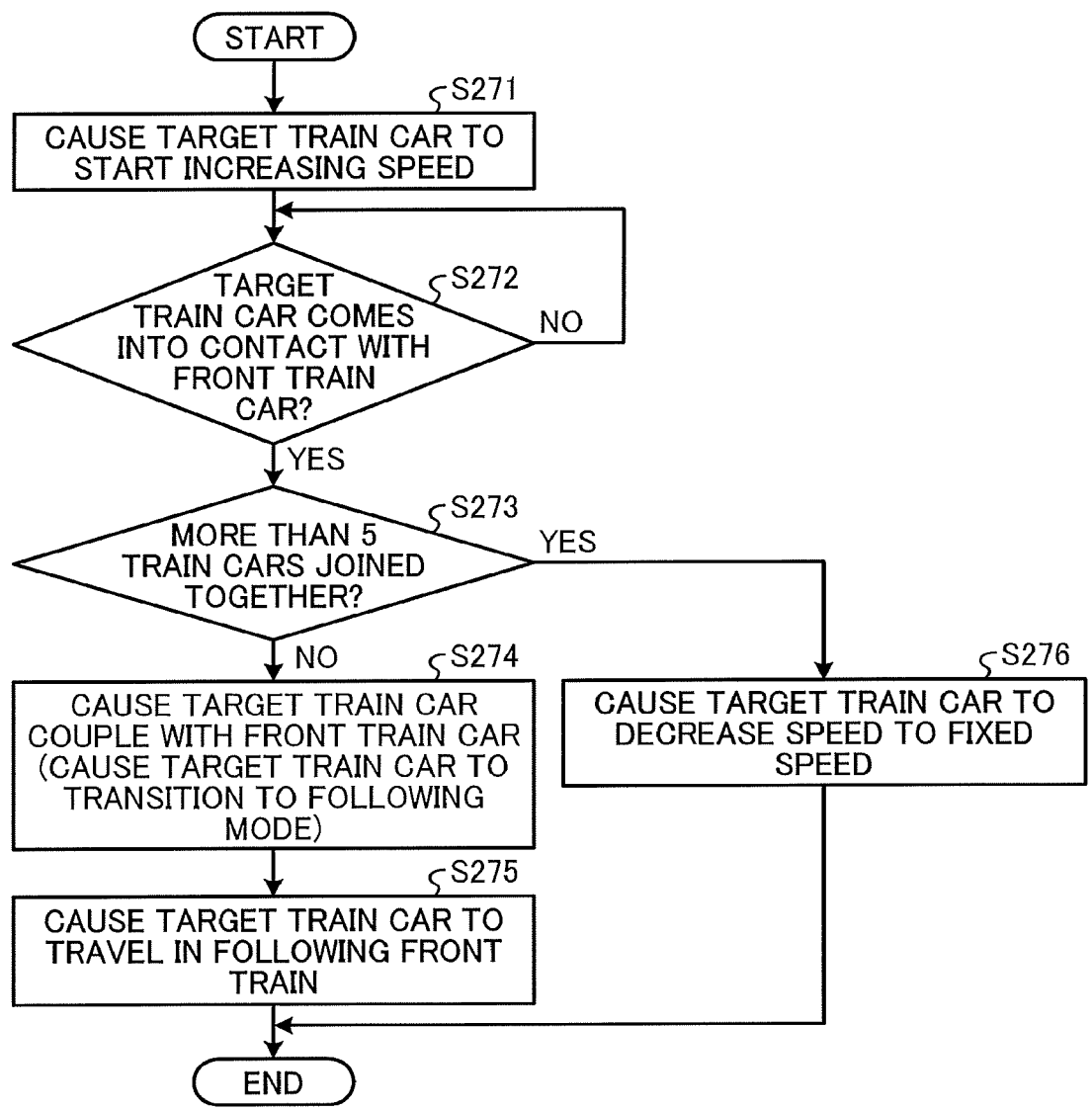
FIG. 16 is a flowchart illustrating a process of causing the train car to couple with another train car in the display area of the display system according to the one of the embodiments.
Figure 17A:
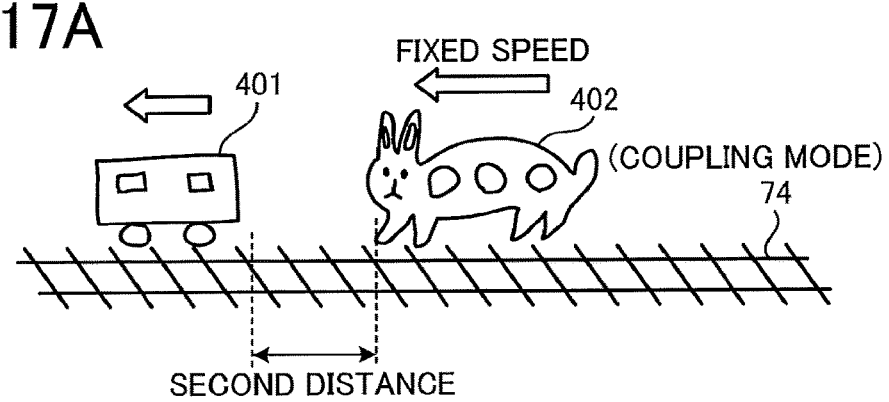
FIGS. 17A to 17C are illustrations of objects, illustrating a coupling process in the display area of the display system according to the one of the embodiments.
Figure 17B:
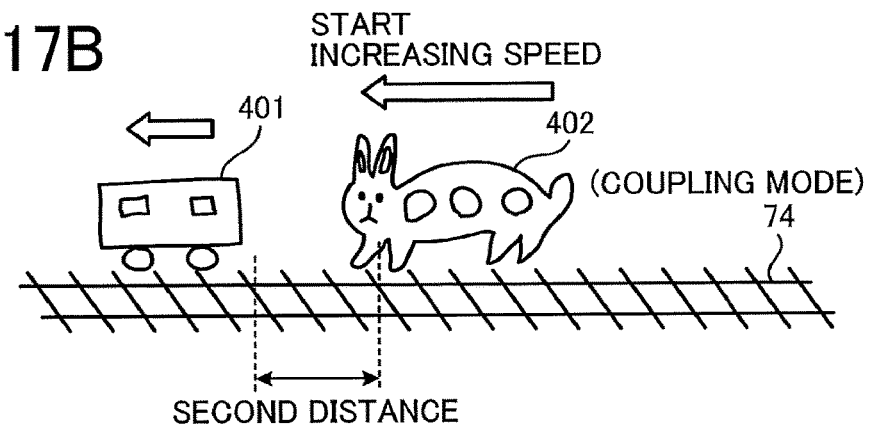
Figure 17C:
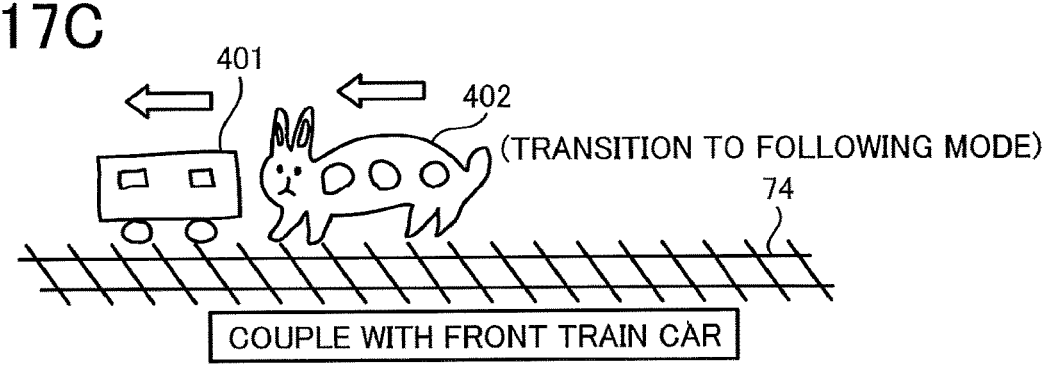
Figure 18A:
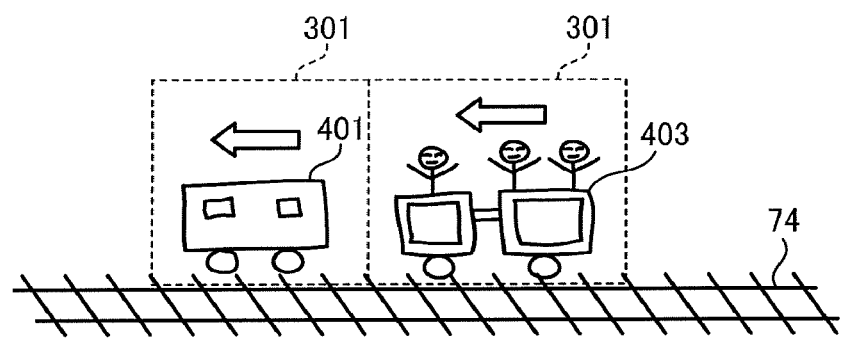
FIGS. 18A and 18B are illustrations of objects, illustrating a space between train cars in coupling the train cars.
Figure 18B:
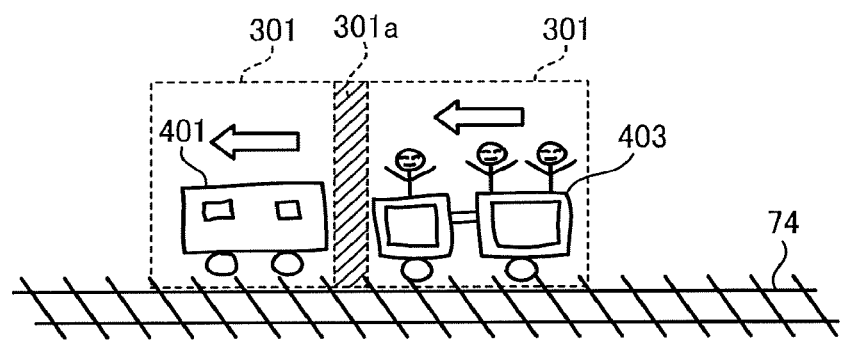

FIG. 16 is a flowchart illustrating the coupling process that is a process of causing the target train car to couple with the front train car in the display area of the display system 1 according to the present embodiment. FIGS. 17A to 17C (FIG. 17) are illustrations of objects for illustrating the coupling process in the display area of the display system 1 according to the present embodiment. FIGS. 18A and 18B (FIG. 18) are illustrations of objects for illustrating a space between train cars joined together. A description is given of the coupling process, which is S27 of FIG. 13, performed by the display controller 10 according to the present embodiment, with reference to FIGS. 16 to 18.

<Step S271>

In the description of the coupling process and in FIGS. 17A to 17C, as an example of the target train car (first user object), the first train car 402 is used and as an example of the front train car (second user object), the second train car 401 is used. Additionally, in FIGS. 18A and 18B, as an example of the target train car (first user object), a first train car 403 is used and as an example of the front train car (second user object), the second train car 401 is used.

When the target train car is in the coupling mode and the distance between the target train car and the front train car becomes less than the second distance, the movement control unit 107 of the display controller 10 causes the target train car to start increasing the speed.

For example, as illustrated in FIG. 17A, when the target train car, which is the first train car, is in the coupling mode and moving at a fixed speed on the main railroad track 74, the condition determination unit 109 determines that the distance between the first train car 402 and the front train car, which is the second train car 401, is less than the second distance. The movement control unit 107, then, causes the first train car 402 to start increasing the speed as illustrated in FIG. 17B.

Subsequently, the process proceeds to S272.

<Step S272>

The condition determination unit 109 of the display controller 10 determines whether the target train car (first train car 402) comes into contact with the front train car (second train car 401).

The following is more specific explanation regarding "train cars being on contact with each other" with reference to FIGS. 18A and 18B, in which the example of the target train car is the first train car 403 instead of the first train car 402 for easy understanding.

The condition determination unit 109 determines that the target train car (first train car 403) comes into contact with the front train car (second train car 401), when, for example a front end portion of the drawing area 301 in which the original drawing of the target train car that is the first train car 403 in FIG. 18A, namely the character image of the target train car (first train car 403) is drawn, comes into contact with a back end portion of the drawing area 301 in which the original drawing of the second train car 401, namely a character image of the front train car (second train car 401) is drawn, as illustrated in FIG. 18A.

However, a train car may not be always drawn in a manner that the outline of the drawing is on contact with the both ends of the left side and the right side of the drawing area 301 of the sheet of paper 30, and thereby a space may cause. In this case, the method explained above with reference to illustrated in FIG. 18A may determine that the contact between the two train cars occurs, even when there is a space between the train cars. Accordingly, as illustrated in FIG. 18B, another method may be used and the contact may be determined when the drawing areas 301 each corresponding to one of the target train car (first train car 403) and the front train car (second train car 401) are overlapped with each other by the area size corresponding to an overlapping area 301a. This determination is made by considering the space in the drawing area 301 of the sheet of paper 30 in which the picture of the train car is drawn, and achieve to express a state of the contact between the train cars in a natural way. Additionally, the states illustrated in FIGS. 18A and 18B are not only indicating the state of the contact between the train cars, which are the first train car 403 and the second train car 401, but may also be indicating a state of coupling of the train cars, the first train car 403 and the second train car 401, as described later.

Return to the description of the coupling process, when the target train car comes into contact with the front train car (S272: YES), the process proceeds to S273. On the other hand, when the target train car does not come into contact with the front train car (S272: NO), the condition determination unit 109 continuously determines whether the target train car comes into contact with the front train car.

<Step S273>

The condition determination unit 109 determines whether the number of train cars in a train (a set of train cars) including the target train car and the front train car is more than five, if the target train car and the front train car are coupled with each other to be joined together as a part of or all parts of the train. For example, if the front train car is the last one of a train including five train cars before the coupling, the number of train cars becomes six after the target train car couples with the front train car. Then the condition determination unit 109 determines that the number of train cars in the train including the target train car and the front train car is more than five. Alternatively, assuming that the front train car is the last one of a train including three train cars before the coupling and the target train car is the first train car of a train (being top in a train) including four train cars before the coupling, the number of train cars becomes seven, when the target train car and the front train car are coupled with each other. Then, the condition determination unit 109 determines that the number of train cars in the train including the target train car and the front train car is more than five.

It should be noted that the limited number of train cars in a train is not limited to five, and any other number than five may be used.

When the number of train cars of the train exceeds five (S273: YES), the process proceeds to S276, otherwise (S273: NO), the process proceeds to S274.

<Step S274>

The movement control unit 107 causes the target train car to couple with the front train car to cause the target train car to follow the front train car. Then, the mode management unit 108 causes the target train car to transition from the coupling mode to the following mode.

For example, as illustrated in FIG. 17C, the movement control unit 107 causes the first train car 402, which is the target train car, to couple with the second train car 401, which is the front train car, and then causes the first train car 402 to follow the second train car 401 after the coupling. Subsequently, the mode management unit 108 causes the train car 402 to transition from the coupling mode to the following mode.

Subsequently, the process proceeds to S275.

<Step S275>

The movement control unit 107 causes the target train car being coupled with the front train car to follow the front train car to travel at a fixed speed of the front train car. If the front train car is in the following mode and is following another train car with which the front train car is connected, the movement control unit 107 causes the target train car to follow the front train car at a fixed speed of the train car, which is a first train car of the train, with which the front train car is connected, namely a train car placed at a top of the train including a set of train cars joined together including the target train car and the front train car. Then, the coupling process is completed.

<Step S276>

The movement control unit 107 causes the target train car not to couple with the front train car, but to decrease the speed to the fixed speed of the target train car according to the speed-decreasing rate, which is the one of the parameters associated with the target train car. The movement control unit 107 may cause the target train car to decrease the speed until a distance from the front train car becomes more than the second distance. Then, the coupling process is completed.

Through S271 to S276, the coupling process is performed. As described above, the target train car being in the coupling mode start increasing the speed when the distance from the front train car becomes less than the predetermined distance. Accordingly, the user 50 can enjoy by watching a train including a set of train cars.

Additionally, even when the target train car is in the coupling mode, the target train car is not caused to couple with the front train car when the number of train cars in a train is to exceed a predetermined number of cars (for example, five cars). This prevents the train cars from constantly coupled with the one another.

In the embodiment described above, the target train car is caused not to couple with the front train car, if the number of train cars included in a train to exceed five in a case of the coupling of the target train car and the front train car, however the embodiments are not limited to this. That is, as long as the number of train cars in a train is equal to or less than five, other operation may be performed. For example, assuming that the front train car is the last train car of a set of train cars in a first train including three train cars and the target train car is the first (top) train car of a set of train cars in a second train including three train cars, when the target train car comes into contact with the front train car, the two train cars, which are placed after the target train car, out of the three train car in the set of train cars included in the second train are caused to be separated from the target train car and the target train car may couple with the front train car, resulting in a train including the five train cars including the front train car and the target train car.

(Spur-Taking Process)

FIG. 19 (FIGS. 19A and 19B) is a flowchart illustrating the spur-taking process, namely course changing process, which includes a process of determining whether to cause the target train car to take the spur 76 and a process performed subsequent to the determination in the display area of the display system 1 according to the present embodiment. That is, the target train car changes the course by taking the spur 76. A description is given of the spur-taking process, which corresponds to S29 of FIG. 13, performed by the display controller 10, according to the present embodiment with reference to FIG. 19 (FIGS. 19A and 19B).

<Step S291>

The condition determination unit 109 of the display controller 10 determines whether to cause the target train car to take the spur 76 to change the course according to the spur-taking rate (condition for changing the course) of the parameter associated with the target train car, when the target train car is at the fork 75 of the main railroad track 74 on which the target train car is currently traveling. Subsequently, the process proceeds to S292.

<Step S292>

When the condition determination unit 109 determines that the target train car is to take the spur 76 (S292: YES) to change the course, the process proceeds to S293. On the other hand, when the condition determination unit 109 determines that the target train car is not to take the spur 76 (S292: NO) the process proceeds to S297.

<Step S293>

When determining that the target train car is to take the spur 76 to change the course, the condition determination unit 109 determines whether there is a front train car to which the target train car follows. When there is the front train car to which the target train car follows (S293: YES), the process proceeds to S294. On the other hand, when there is no front train car to which the target train car follows (S293: NO), the movement control unit 107 causes the target train car to take the spur 76 to change the course, and the process is completed.

<Step S294>

When the front train car to which the target train car follows takes the spur 76 (S294: YES), the process proceeds to S296, otherwise, namely when the front train car does not take the spur 76 (S294: NO), the process proceeds to S295.

<Step S295>

The movement control unit 107 releases the coupling of the front train car and the target train car, namely causes the target train car to be separated from the front train car, because one of the front train car and the target train car takes the spur 76 to change the course, but the other one does not take the spur 76. The movement control unit 107 causes the target train car to travel at the fixed speed, at which the target train car is previously traveling, after the coupling of the front train car and the target train car is canceled. The mode management unit 108 causes the target train car to transition from the following mode to the normal mode. Then, the spur-taking process is completed.

<Step S296>

The movement control unit 107 causes the front train car and the target train car to stay in the coupling state, because both of the front train car to which the target train car follows and the target train car take the spur 76 to change the course. The mode management unit 108 causes the target train car to stay in the following mode. Then, spur-taking process is completed.

<Step S297>

When determining that the target train car does not take the spur 76, the condition determination unit 109 determines whether there is a front train car to which the target train car follows or not. When there is the front train car to which the target train car follows (S297: YES), the process proceeds to S298. On the other hand, when there is not the front train car to which the target train car follows (S297: NO), the movement control unit 107 does not cause the target train car to take the spur 76 and keep traveling on the main railroad track 74 on which the target train car is currently traveling. Then, this process is completed.

<Step S298>

When the front train car to which the target train car follows takes the spur 76 to change the course (S298: YES), the process proceeds to S295. On the other hand, when the target train car does not take the spur 76 (S298: NO), the process proceeds to S299.

<Step S299>

The movement control unit 107 causes the front train car and the target train car to stay in the coupling state because the front train car to which the target train car follows and the target train car do not take the spur 76. The mode management unit 108 causes the target train car to stay in the following mode. Then, the spur-taking process is completed.

Through S291 to S299, the spur-taking process is performed. That is, when the front train car and the target train car are in the coupling state, determination of whether to take the spur 76 to change the course or not is made individually for the front train car and the target train car at the fork 75. Additionally, when one of the front train car and the target train car is determined to take the spur 76 to change the course and the other one is determined not to take the spur 76 the coupling is canceled and the target train car is cause to transition to the normal mode. With the spur-taking process described above, more complicated movement of the target train car is achieved in a manner that the target train car travels on all over the main railroad track 74, instead of traveling simply on a specific one of the main railroad tracks 74. This can give an effect on user's attention, that is, the user 50 can watch, without feeling board, the target train car moving all over the railroad track. Additionally, after canceling the coupling, the user 50 can enjoy watching while expecting that the target train car is to start traveling on new one of the main railroad track 74 and/or the target train car is to couple with another new front train car.

(Process of Causing Train Car Object to Enter Main Railroad Track from Spur)

Figure 20:
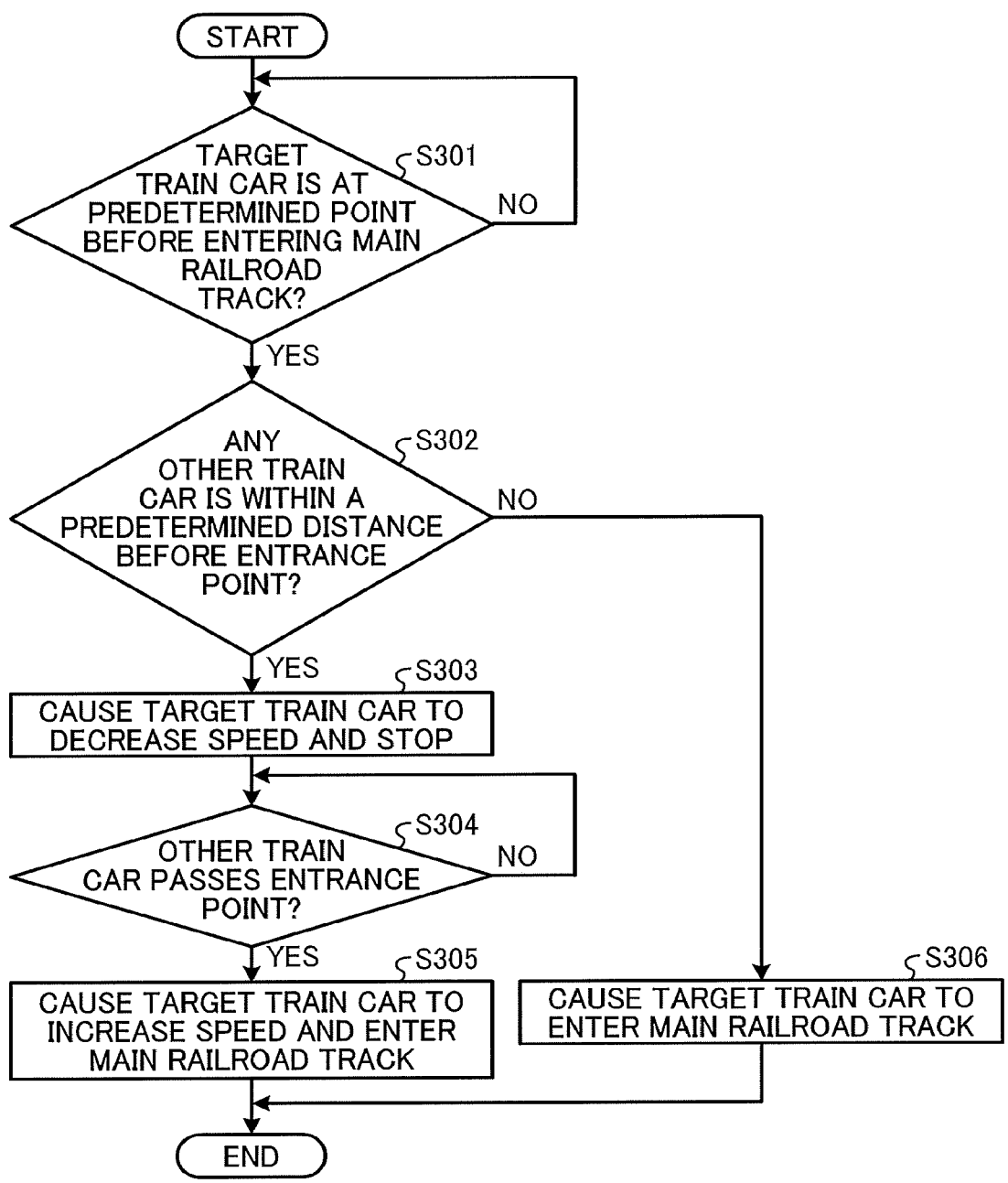
FIG. 20 is a flowchart illustrating a process of causing a target train car to take the main railroad track from the spur in the display area of the display system according to the one of the embodiments.

FIG. 20 is a flowchart illustrating a process of causing a target train car object to enter (take) the main railroad track 74 from the spur 76 in the display area of the display system 1 according to the present embodiment. FIGS. 21A to 21D are illustrations of objects for illustrating the process of causing the target train car to enter the main railroad track 74 in the display area of the display system 1 according to the present embodiment. A description is given of the process of causing the target train car to enter the main railroad track 74, performed by the display controller 10 according to the present embodiment with reference to FIGS. 20, and 21A to 21D. This process corresponds to 530 of FIG. 13.

<Step S301>

When determining that the target train car currently travels on the spur 76, the condition determination unit 109 determines whether the target train car comes at a predetermined point positioned before an entrance point EP on the spur 76. The entrance point EP is a point on the spur 76 leading to the main railroad track 74 (second main railroad track) that is different from previous one of the main railroad track 74 (first main railroad track) on which the target train car previously travels before taking the spur 76 on which the target train car currently travels.

In the description of the process, and in FIGS. 21A to 21D, as an example of the target train car (first user object), a first train car 410 is used.

Figure 21A:
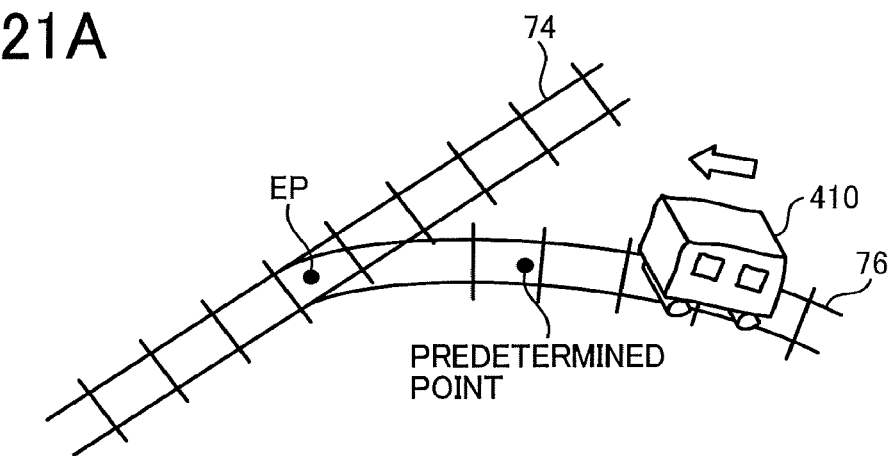
FIGS. 21A to 21D are illustrations of objects for illustrating the process of causing the target train car to take the spur in the display area of the display system according to the one of the embodiments.
Figure 21B:
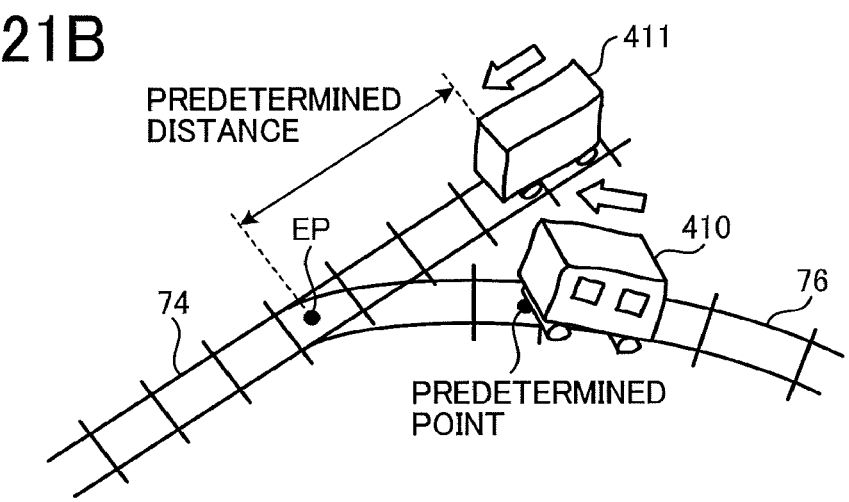

For example, referring to FIG. 21A, the target train car, which is the first train car 410, which is on the spur 76, does not come at the predetermined point, which is positioned before the entrance point EP leading to one of the main railroad tracks 74 (second main railroad track) that is different from the previous one of the main railroad tracks 74 (first main railroad track). When the first train car 410 (target train car) comes at the predetermined point (S301: YES), the process proceeds to S302. On the other hand, when the first train car 410 (target train car) does not come at the predetermined point (S301: NO), the condition determination unit 109 continuously determines whether the first train car 410 (target train car) comes at the predetermined point positioned before the entrance point EP, which leads to the different one of the main railroad tracks 74 (second main railroad track), on the spur 76.

<Step S302>

When the target train car comes at the predetermined point positioned before the entrance point EP, which leads to the different one of the main railroad tracks 74, on the spur 76, the condition determination unit 109 determines whether there is any other train car (third user object) within a predetermined distance behind from the entrance point EP. In the description, an example of the other train car (third user object) is a third train car 411. For example, referring to FIG. 21B, the other train car, which is the third train car 411, is within the predetermined distance behind from the entrance point EP on the other main railroad track 74, when the target train car (first train car 410) comes at the predetermined point positioned before the entrance point EP, which leads to the different one of the main railroad tracks 74, on the spur 76. When the third train car 411 (other train car) is within the predetermined distance behind from the entrance point EP on the other main railroad track 74 (second main railroad track) (S302: YES), the process proceeds to S303. When there is not any other train car within the predetermined distance behind from the entrance point EP on the main railroad track 74 (second main railroad track) (S302: NO), the process proceeds to S306.

<Step S303>

The movement control unit 107 causes the first train car 410 (target train car) to decrease the speed from the predetermined point of the spur 76 (see FIG. 21C), and the process proceeds to S304.

<Step S304>

Figure 21C:
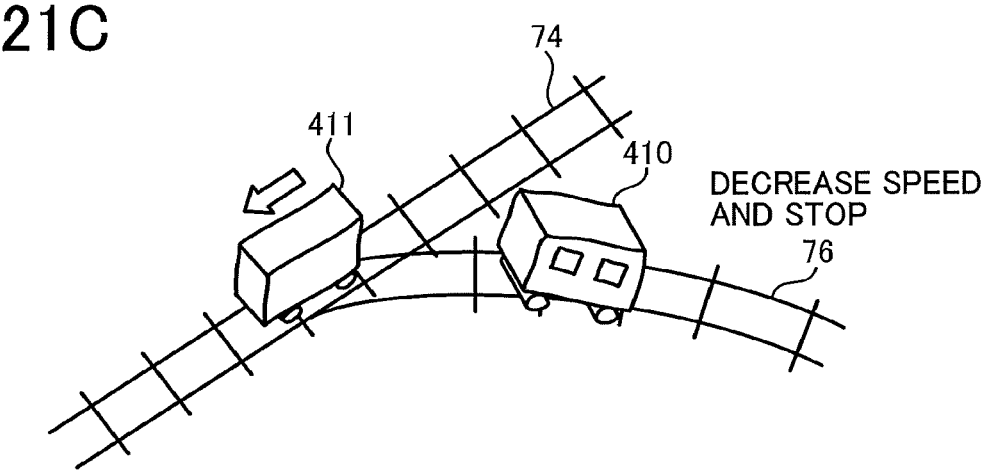

The condition determination unit 109 determines whether the third train car 411 (other train car) passes the entrance point EP on the other main railroad track 74 while the first train car 410 (target train car) is stop moving and waiting on the spur 76 (see FIG. 21C). When the third train car 411 (other train car) passes the entrance point EP (S304: YES), the process proceeds to S305. When the third train car 411 (other train car) does not pass the entrance point EP (S304: NO), the condition determination unit 109 continuously determines whether the third train car 411 (other train car) passes the entrance point EP on the other main railroad track 74.

<Step S305>

Figure 21D:
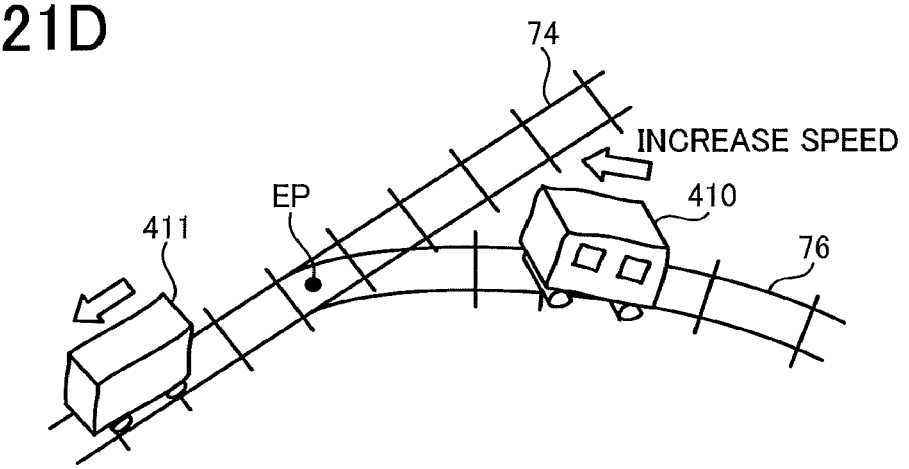

When the third train car 411 (other train car) passes the entrance point EP, the movement control unit 107 causes the first train car 410 (target train car) to start moving, increase the speed, and take the other main railroad track 74 (see FIG. 21D). Then, this process is completed.

<Step S306>

When there is not any other train car within the predetermined distance behind from the entrance point EP, the movement control unit 107 causes the first train car 410 (target train car) to keep traveling as the first train car 410 currently is and take the main railroad track 74. Then, this process is completed.

Through S301 to S306, the process of causing the target train car to enter the main railroad track 74 from the spur 76 is performed. That is, the target train car is caused to decrease the speed, stop to wait on the spur 76 until the other train car passes the entrance point EP. This prevents the target train car from having a collision with other train car in entering other one of the main railroad tracks 74 after taking the spur 76 from the fork 75 on the previous one of the main rail road tracks 74 in a case where the other train car is approaching to the entrance point EP. This allows the target train car to take the other main railroad track 74 smoothly while avoiding collision with the other train car when the train car enters the other main railroad track 74.

(Touch Event Process)

Figure 22:
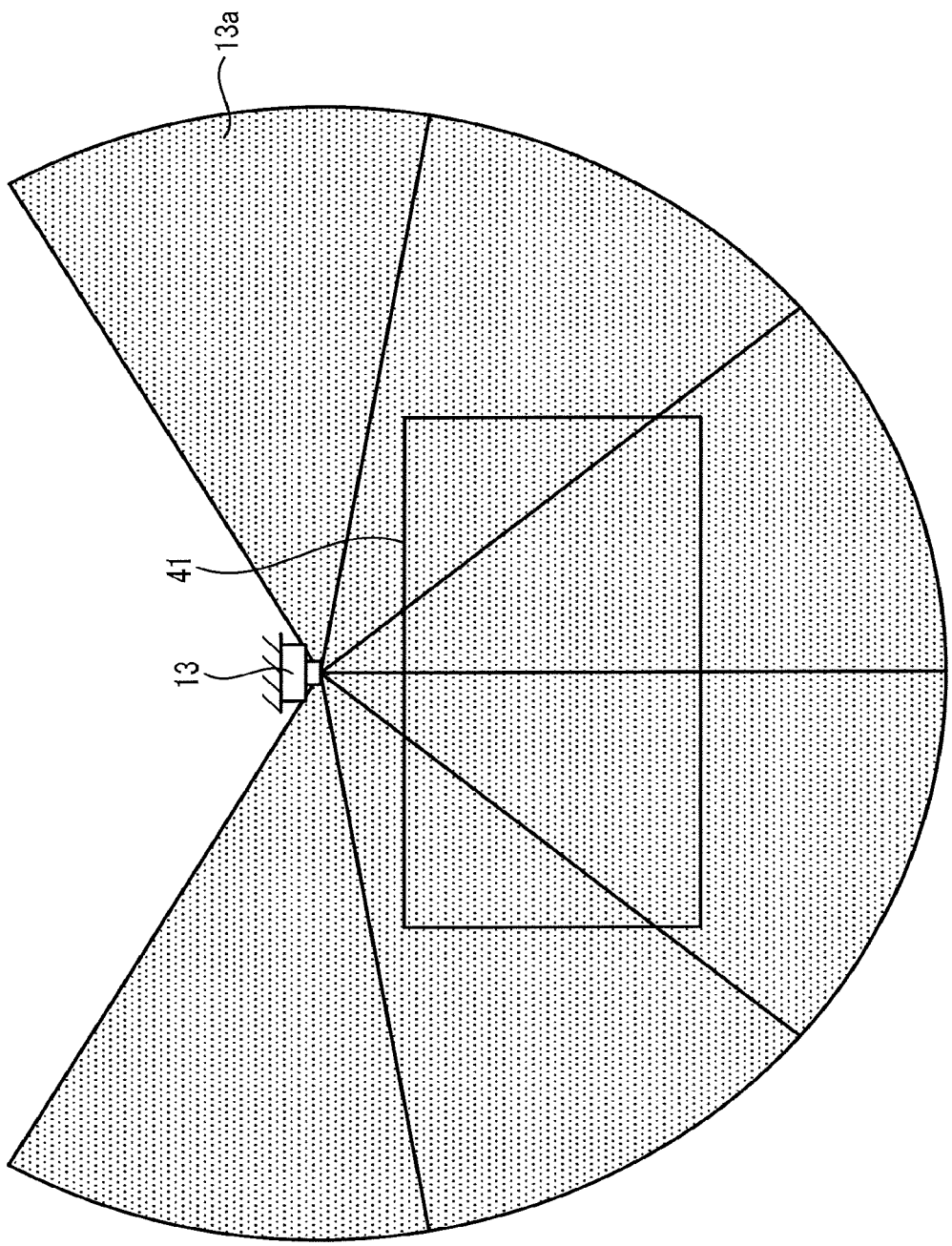
FIG. 22 is an illustration of a detection range of an area sensor in the display system according to the one of the embodiments.
Figure 23:
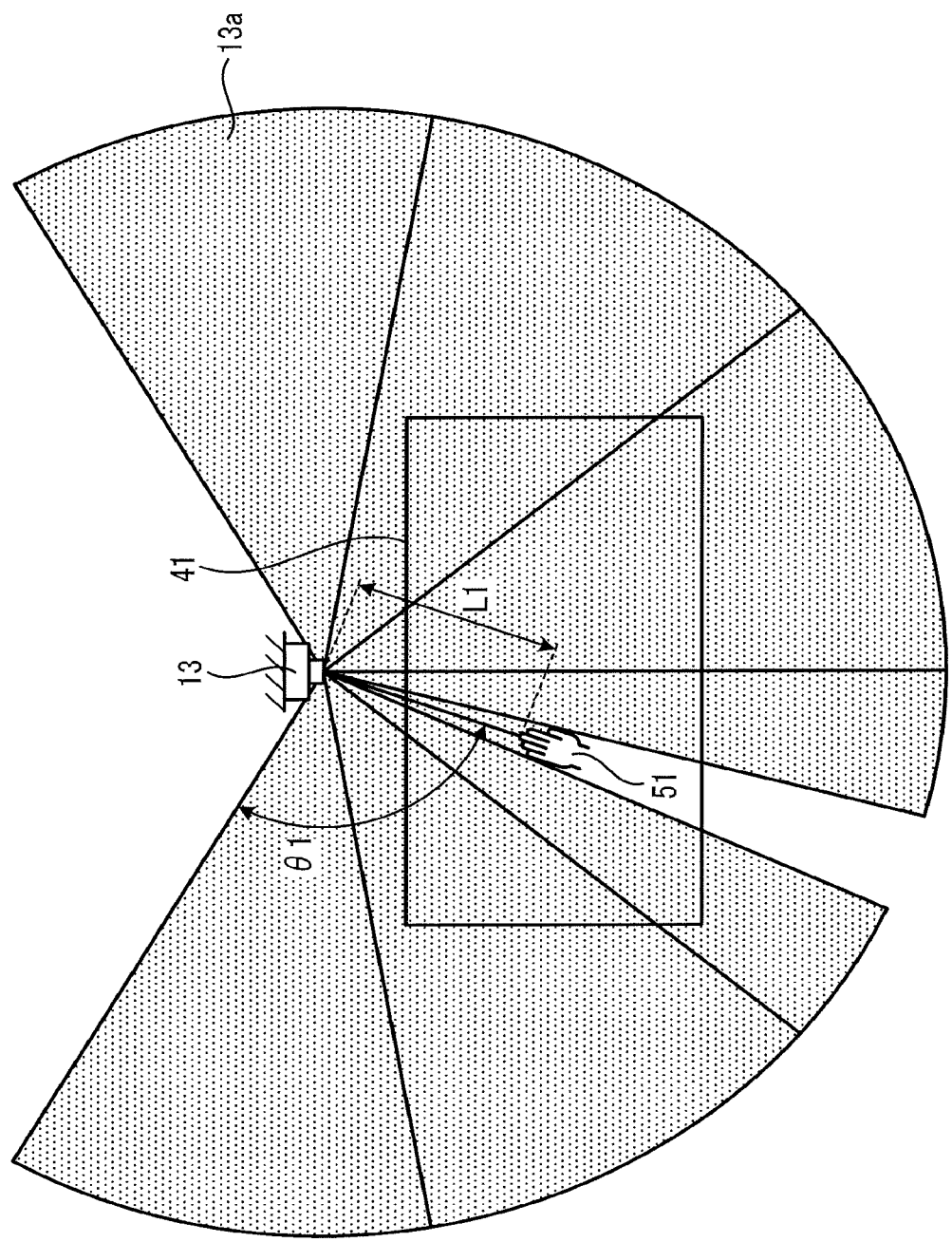
FIG. 23 is an illustration of a touch event detected in the detection range in the display system according to the one of the embodiments.
Figure 24:
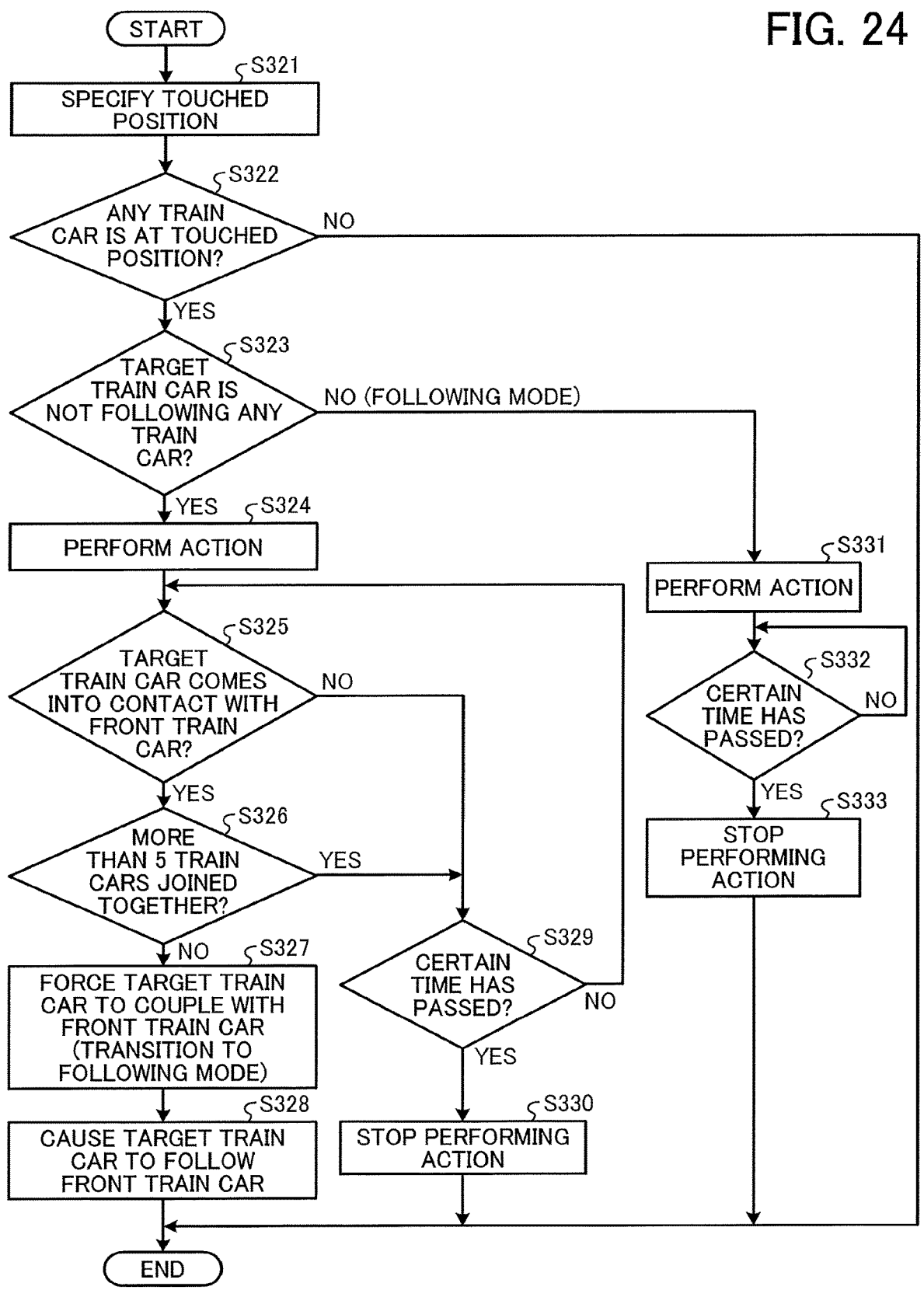
FIG. 24 is a flowchart illustrating a touch event process in the display area in the display system according to the one of the embodiments.

FIG. 22 is an illustration of a detection range 13a of the area sensor 13 of the display system 1 according to the present embodiment. FIG. 23 is an illustration of a touch event detected in the detection range 13a in the display system 1 according to the present embodiment. FIG. 24 is a flowchart illustrating the touch event process, which is the process in which one or more actions are performed in relation to a target train car when the user 50 touches the target train car in the display area of the display system 1 according to the present embodiment. FIGS. 25A to 25E are illustrations of the objects for illustrating the touch event process in the display area in the display system 1. A description is given of the touch event process that is a process performed by the display controller 10 according to the present embodiment when a target train object is touched by a user, with reference to FIG. 22 to FIG. 25. This process corresponds to S32 of FIG. 13.

At first, detecting touching operation of the user 50 with the area sensor 13 and the detection range 13a are described in detail with reference to FIG. 22 and FIG. 23. Referring to FIG. 22, the area sensor 13 is disposed on the celling located above the screen 40 to which the projection image 41 is projected. The area sensor 13 detects an object, such as the hand, which is a hand 51 in FIG. 23, of the user 50, being in front of the screen 40 (detects touching operation), and transmits position information on the detected object to the input unit 111 of the display controller 10. In the example of FIG. 22, the detection range 13a is illustrated as a range detectable by the area sensor 13. The detection range 13a is configured in a fan shape with laser illuminated in direction of a predetermined angle (for example 270 degree), from the area sensor 13 being as a center of the fan shape. When the object, such as the hand 51 of the user 50, is in the detection range 13a, the area sensor 13 measures a time from when the laser starts being illuminated to when the laser that hits the object and reflect to return to the center to calculate a distance between the area sensor 13 and the object. The area sensor 13 specifies an angle at which the object is, by specifying which angle the reflected laser comes from. That is, the area sensor 13 detects a position of the object by specifying the distance from the area sensor 13 to the object placed within the detection range 13a and the angle of a direction in which the object is.

In the example of FIG. 23, the hand 51 of the user 50 touches on the projection image 41 projected on the screen 40. As illustrated in FIG. 23, the area sensor 13 specifies a distance L1 that is from the area sensor 13 to the hand 51, which is within the detection range 13a and an angle θ1 of the direction of the hand 51. Subsequently, the input unit 111 inputs position information on the hand 51, which is within the detection range 13a and specified by the area sensor 13. Additionally, by associating the position information related to the touching operation in the detection range 13a input by the input unit 111 with an actual position on the projection image 41 in advance, the position specifying unit 112 specifies where on the projection image 41 is touched by the hand 51 according to the position information input by the input unit 111.

A specific description of the touch event process is given below with reference to FIG. 24 and FIG. 25.

<Step S321>

When the condition determination unit 109 determines that the touching operation is made by the hand 51 of the user 50, namely the user touches the projection image 41, the position specifying unit 112 specifies where on the projection image 41 is touched by the hand 51 (touched position), based on association information associating the position information on the hand 51 input by the input unit 111 and a position on the projection image 41. Subsequently, the process proceeds to S322.

<Step S322>

The condition determination unit 109 determines whether there is a train car at the touched position, which is specified by the position specifying unit 112, on the projection image 41. That is, the condition determination unit 109 determines whether any one of train cars displayed on the projection image 41 is touched by the user 50 or not. For example, referring to FIG. 25A, a first train car 404 displayed on the projection image 41 is touched by the hand 51 of the user 50. When the first train car 404 is at the touched position on the projection image 41 (S322: YES), the process proceeds to S323. On the other hand, when there is not any train car at the touched position (S322: NO), the touch event process is completed.

<Step S323>

Figure 25A:
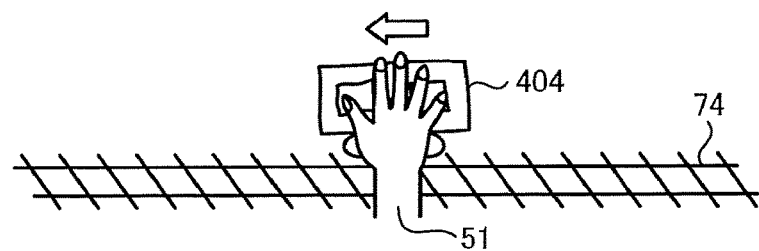
FIGS. 25A to 25E are illustrations of the objects for illustrating the touch event process in the display area in the display system according to the one of the embodiments.
Figure 25B:
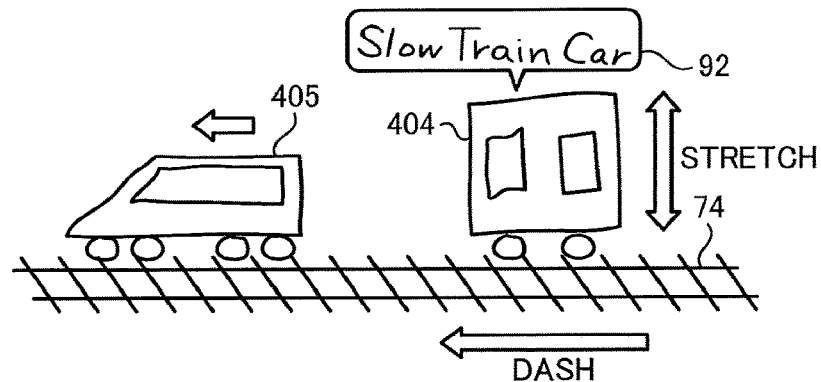
Figure 25C:
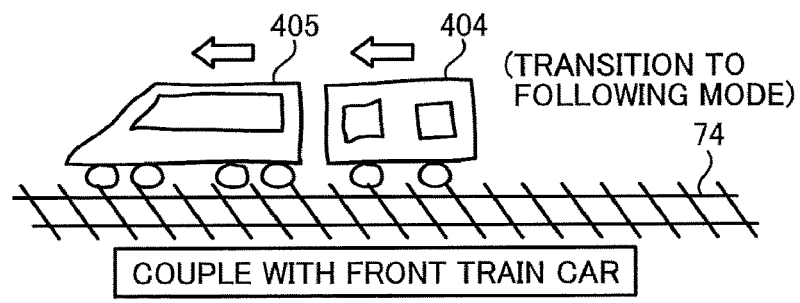
Figure 25D:
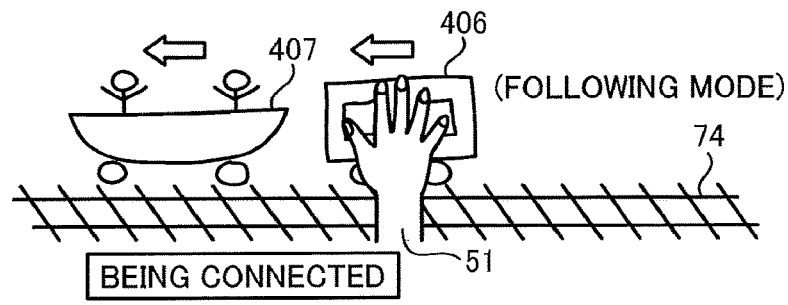

The train car being at the touched position on the projection image 41 is referred to as a "target train car" in the description with reference to FIG. 24. The condition determination unit 109 determines whether the target train car is traveling alone, if no, determines whether the target train car is at a top of a train including a set of train cars connected to each other. When the target train car is traveling alone or at the top of the train (S323: YES), the process proceeds to S324. On the other hand, when the target train car is not traveling alone or at the top of the train, but in the following mode to follow other train car in the train (S323: NO), the process proceeds S331. In the example of FIG. 25A, the first train car 404, which is the target train car, traveling alone is touched by the hand 51 of the user 50. In the example of FIG. 25D, a train car 406, which is also the target train car, being in the following mode and following a train 407 is touched by the hand 51 of the user 50.

<Step S324> the movement control unit 107 performs actions in relation to the target train car touched by the hand 51. As examples of the actions, the target train car, the first train car 404 in FIG. 25B is forced to dash and stretch in a perpendicular direction (one example of change in shape), and a balloon object 92 indicating the title image 322 corresponding to the target train car, which is the first train car 404, is displayed. Further, the audio control unit 116 causes the audio output unit 117 to output sound for the actions. Performing the actions in relation to the target train car as described above indicates that the first train car 404 is touched by the user 50. The actions that are different from usual operation of the first train car 404 can attract the interest of the user 50. Furthermore, the above-mentioned actions are made by the touching operation in relation to the screen 40 on which the projection image 41 is projected, which is not a touch panel usually used by the user 50. This gives unusual interesting impression to the user 50 to attracts the interests of the user 50. Subsequently, the process proceeds to S325.

<Step S325>

The condition determination unit 109 determines whether the target train car comes into contact with a front train car because the target train car dashes. When the target train car comes into contact with the front train car (S325: YES), the process proceeds to S326. When the target train car does not come into contact with the front train car (S325: NO), the process proceeds to S329.

\<Step S326\>

The condition determination unit 109 determines whether the number of train cars of a train (a set of train cars) including the target train car and the front train car is more than a predetermined number, for example five, here, if the target train car and the front train car are coupled with each other. It should be noted that the predetermined number of the train cars in a train may be any other than five. When the number of train cars of the train exceeds five (S326: YES), the process proceeds to S329, otherwise (S326: NO) process proceeds to S327.

\<Step S327\>

The movement control unit 107 forces the target train car to couple with the front train car, namely causes the target train car to follow the front train car. The mode management unit 108 causes the target train car to transition to the following mode. Referring to the example of FIG. 25C, the movement control unit 107 forces the first train car 404, which is the target train car, to couple with a second train car 405, which is an example of the front train car, to cause the first train car 404 to follow the second train car 405. The mode management unit 108, then, causes the first train car 404 to transition to the following mode.

Subsequently, the process proceeds to S328.

\<Step S328\>

The movement control unit 107 causes the target train car being coupled with the front train car to follow the front train car at a fixed speed of the front train car. When the front train car being in the following mode is following other train car, the movement control unit 107 causes the target train car to follow the front train car at a fixed speed of the other train car to which the front train car directly follows, namely a train car placed at a top of the train of a set of train cars including the target train car and the front train car. Then, the touch event process is completed.

\<Step S329\>

The condition determination unit 109 determines whether a certain period of time has passed since one or more actions related to the target train car are performed. When the certain period of time has passed (S329: YES), the process proceeds to S330, otherwise (S329: NO), the process returns to S325.

\<Step S330\>

When the certain period of time has passed since the one or more actions in relation to the target train car including dashing are performed, the movement control unit 107 stops performing the actions in relation to the target train car. Then, the touch event process is completed.

\<Step S331\>

Figure 25E:
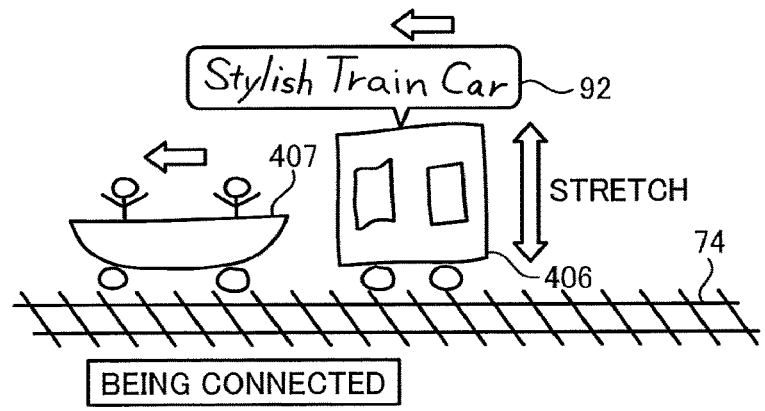

The movement control unit 107 performs one or more actions in relation to the target train car, which is in the following mode, in response to the touch event. As examples of the actions, the target train car, the first train car 406 in FIG. 25E is stretched in a perpendicular direction (one example of change in shape), and the balloon object 92 indicating the title image 322 corresponding to the target train car is displayed. Further, the audio control unit 116 causes the audio output unit 117 to output sound for the actions. In these actions, the target train car does not dash, because the target train car is following to the front train, which is different from the actions performed in S324. Performing the actions in relation to the target train car as described above indicates that the first train car 406 is touched by the user 50. The actions that are different from usual operation of the first train car 406 can attract the interest of the user 50. Furthermore, the above-mentioned actions are made by the touching operation in relation to the screen 40 on which the projection image 41 is projected, which is not a touch panel usually used by the user 50. This gives unusual interesting impression to the user 50 to attracts the interests of the user 50. Subsequently, process proceeds to S332.

\<Step S332\>

The condition determination unit 109 determines whether a certain period of time has passed since one or more actions related to the target train car are performed. When the certain period of time has passed (step S332: YES), the process proceeds to step S333. When the certain period of time has not passed (step S332: NO), the condition determination unit 109 continuously determines whether or not the certain period of time has passed.

\<Step S333\>

When the certain period of time has passed since the one or more actions in relation to the target train car including dashing are performed, the movement control unit 107 stops performing the actions in relation to the target train. Then, the touch event process is completed.

Through S321 to S333, the touch event process is performed. That is, the above-described actions are made in response to touching the train car on the projection image 41, this attracts the interest of the user 50 because the user 50 can watch unique operation of the train car, which is different from the usual operation of the train car. Additionally, touching the train car on the projection image 41 invokes the actions including forcing the target train to increase the speed and couple with the front train. This may make the user 50 feel excited.

Additionally, in the present embodiment, the touch event process described above is performed when the condition determination unit 109 determines that there is the touching operation, however this is not limiting the embodiments of the disclosure. For example, the touch event may be performed when the user 50 clicks with a mouse that is the input device 1010.

According to the display system 1 of the present embodiment described above, the target train car being in the coupling mode is caused to couple with the front train car when the distance between the target train car and the front train car is equal to or less than the predetermined distance (second distance), and the coupling between the target train car and the front train car is canceled at the fork 75 when a result of the determination whether to take the spur 76 to change the course or not for the target train car is different from that for the front train car. The user 50 can enjoy watching the train in which the train cars are connected to each other, as a usual train is, and also have a high expectation for newly taking the main railroad track 74, which is different from the last one, or coupling with a new train car traveling in front after the current coupling is canceled. With the coupling operation and the coupling-canceling operation, the image (picture) created (drawn) by the hand of the user 50 is dynamically displayed and complicatedly moves.

Additionally, the target train car being in the normal mode transitions to the coupling mode in which the target train car is ready to couple with, the front train car, after decreasing the speed once to make an enough distance from the front train car instead of going straight to couple and join with the front train car. This avoids a situation of heavy traffic, which may be caused because the train car objects are continuously input to the display area 80 and each of the train car objects is coupled with one in front continuously. Namely, a case where a train including a set of train cars coupled with each other and no single train traveling in the image data space can be avoided.

Additionally, the target train car is caused to decrease the speed, stop to wait on the spur 76 until the other train car passes the entrance point EP. This prevents the target train car from having a collision with the other train car in taking the other main railroad track 74 after taking the spur 76 from the fork 75 of the previous one of the main rail road track 74 in a case where the other train car is approaching to the entrance point EP. This allows the target train car to take the other main railroad track 74 smoothly while avoiding collision with the other train car in taking the other main railroad track 74.

Additionally, even when the target train car is in the coupling mode, the target train car is not to be coupled with the front train car when the number of train cars in a train exceeds a predetermined number of train cars (for example, five cars). This prevents a state where the train cars constantly coupled with the one in front.

By performing the actions in relation to the target train car to which the touch event occurs by being touched by the user 50 as described above, touching operation is visibly indicated, which is different from the usual operation, resulting in attracting the interest of the user 50. Furthermore, the above-mentioned actions are made by the touching operation in relation to the screen 40 on which the projection image 41 is projected, which is not a touch panel usually used by the user 50. This gives unusual interesting impression to the user 50 to attracts the interests of the user 50.

The program executed in the display system 1 according to the embodiment described above may be provided by being installed in a ROM or the like in advance.

Alternatively, the program executed in the display system 1 according to the embodiment described above may be stored in a computer readable, recording medium, such as a compact disc read only memory (CD-ROM), a flexible disk (FD), a compact disc recordable (CD-R), and a digital versatile disk (DVD), in a file format installable or executable.

Further, the program executed by the display system 1 according to the embodiment described above may be stored on a computer connected to a network such as the Internet and downloaded via the network. Alternatively, the program executed in the display system 1 according to the embodiment described above may be provided or distributed via a network such as the network.

The program for processing the information executed in the display system 1 has a module configuration including each functional unit described above. As an actual hardware configuration, a CPU reads from the ROM the program and executes the program for processing the information and then each component are loaded to a main memory to generates each functional unit on the main memory.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), DSP (digital signal processor), FPGA (field programmable gate array) and conventional circuit components arranged to perform the recited functions.

Although the embodiments of the disclosure have been described and illustrated above, such description is not intended to limit the disclosure to the illustrated embodiments. Numerous additional modifications and variations are possible in light of the above teachings. It is therefore to be understood that within the scope of the appended claims, the embodiments may be practiced otherwise than as specifically described herein. For example, elements and/or features of different illustrative embodiments may be combined with each other and/or substituted for each other within the scope of this disclosure and appended claims.

What is claimed is:

1. A display control apparatus, comprising circuitry configured to:
   acquire a user image including a manually-drawn image;
   extract a character image corresponding to the manually-drawn image from the user image;
   generate an image of a first user object that is a three-dimensional object of the character image to be appeared in a display area, the display area to be displayed as a display image with a display; and
   cause the image of the first user object to move on a railroad track on the display area; the image of the first user object moving in one direction,
   wherein the circuitry is further configured to:
      couple the image of the first user object to an image of a second user object that is a three-dimensional object, which moves on the railroad track in the same direction as the image of the first user object moves, in response to determination that a distance between the image of the first user object and the image of the second user object on the railroad track satisfies a predetermined condition, and
      separate the image of the first user object from the image of the second user object at a fork on the railroad track according to a predetermined condition for changing a course of the image of the first user object.

2. The display control apparatus of claim 1, wherein the circuitry is further configured to:
   determine whether the distance between the image of the first user object and the image of the second user object is less than a first distance obtained based on a predetermined coupling condition of the image of the first user object;
   decrease a speed of the image of the first user object to increase the distance between the image of the first user object and the image of the second user object in response to a determination indicating that the distance between the image of the first user object and the image of the second user object is less than the first distance;
   assign to the image of the first user object a second distance obtained based on the predetermined coupling condition to make the image of the first user object to transition to a coupling mode; and
   increase the speed of the image of the first user object to make the image of the first user object to couple to the image of the second user object when the distance between the image of the first user object and the image of the second user object becomes equal to or less than the second distance.

3. The display control apparatus of claim 2, wherein, when the distance between the image of the first user object being in the coupling mode and the image of the second user object is equal to or less than the second distance, the circuitry is further configured to:
   determine whether the number of images of user objects to be coupled together exceeds a predetermined number, the images of the user objects to be coupled together including the image of the first user object and the image of the second user object; and
   keep the image of the first user object from coupling to the image of the second user object in response to a determination indicating that the number of images of the user objects to be coupled together exceeds the predetermined number.

4. The display control apparatus of claim 2,
wherein, when the distance between the image of the first user object being in the coupling mode and the image of the second user object is equal to or less than the second distance and the image of the first user object and the image of the second user object are caused to be coupled together, the circuitry is further configured to determine:
whether the number of images of user objects coupled together exceeds a predetermined number, the images of the user objects to be coupled together including the image of the first user object and the image of the second user object; and
when the number of images of the user objects coupled together is determined to exceed the predetermined number, the circuitry is further configured to
increase a speed of one or more images of user objects out of the one or more images of user objects being a first set of images of user objects including the image of the first user object to couple to one or more user objects being a second set of images of user objects including the second set of images of the user objects in a manner that the number of images of user objects coupled together is equal to the predetermined number, the first set of images of the user objects including the image of the first user object at a top, the second set of user objects including the image of the second user object at an end.

5. The display control apparatus of claim 2, wherein, the circuitry is further configured to determine whether to cause the image of the first user object coupling to the image of the second user object to change a course at a fork according to a condition for changing a course of the image of the first user object;
determine whether to cause the image of the second user object to change the course at the fork according to the condition for changing a course of the image of the second user object; and
cause the image of the first user object and the image of the second user object to separate from each other in response to determination indicating to cause one of the image of the first user object and the image of the second user object to change the course.

6. The display control apparatus of claim 2,
wherein, when the image of the first user object is determined to change a course at a fork, the circuitry is further configured to cause the image of the first user object to change the course from a first main railroad track at the fork, and take a second main railroad track from a spur, the first main railroad track and the second main railroad track being included in the railroad track.

7. The display control apparatus of claim 6, wherein the circuitry is further configured to determine whether there is an image of a third user object approaching in a predetermined distance from an entrance point, after the image of the first user object is caused to change the course, the entrance point leading to the second main railroad track, and
cause the image of the first user object to stop on the spur until the image of the third user object passes the entrance point and takes the second main railroad track.

8. The display control apparatus of claim 2, further comprising:

a sensor configured to
detect a position of an object being around a display displaying the display image and transmit position information on the position of the object, and
specify, on the display image, a position corresponding to the detected position of the object based on the position information,
wherein the circuitry is further configured to
determine whether there is any one of the images of the user objects at the specified position on the display image corresponding to the position of the object, and
perform at least one action in relation to the image of the user objects being at the specified position corresponding to the position of the object, in response to a determination indicating that there is the image of the user object at the specified position corresponding to the position of the object on the display image, the at least one action is changing a shape of the image of the user object being at the specified position.

9. The display control apparatus of claim 8,
wherein, when the circuitry determines that there is the one of the images of the user objects at the specified position corresponding to the position of the object on the display image, and the one of the images of the user objects is not coupled with another one of the images of the user objects being in front of the one of the images of the user objects, the circuitry is further configured to force the one of the images of the user objects to increase the speed, and couple with the other image of the user object in front when the one of the images of the user objects comes into contact with the other image of the user object.

10. The display control apparatus of claim 1,
wherein the circuitry is further configured to generate parameters based on an analysis result corresponding to the character image extracted, each parameter defining a movement of the image of the user object that is a three-dimensional object of the character image.

11. A display system, comprising:
the display control apparatus of claim 1; and
the display configured to display the display image.

12. A displaying control method, comprising:
acquiring a user image including a manually-drawn image;
extracting a character image corresponding to the manually-drawn image from the user image;
generating an image of a first user object that is a three-dimensional object of the character image to be appeared in a display area, the display area to be displayed as a display image with a display; and
controlling the image of the first user object to move on a railroad track arranged in the display area; the image of the first user object moving in one direction,
the controlling the image of the first user object including:
coupling the image of the first user object and an image of a second user object, which moves on the railroad track in the same direction as the image of the first user object moves, together in response to determination that a distance between the image of the first user object and the image of the second user object on the railroad track satisfies a predetermined condition; and
separating the image of the first user object from the image of the second user object at a fork on the railroad track according to a predetermined condition for changing a course of the image of the first user object.

13. A non-transitory recording medium storing a plurality of instructions which, when executed by one or more processors, cause the processors to perform a method, comprising:

acquiring a user image including a manually-drawn image;

extracting a character image corresponding to the manually-drawn image from the user image;

generating an image of a first user object that is a three-dimensional object of the character image to be appeared in a display area, the display area to be displayed as a display image with a display; and controlling the image of the first user object to move on a railroad track arranged in the display area; the image of the first user object moving in one direction, the controlling the image of the first user object including:

coupling the image of the first user object and an image of a second user object, which moves on the railroad track in the same direction as the image of the first user object moves, together in response to determination that a distance between the image of the first user object and the image of the second user object on the railroad track satisfies a predetermined condition; and separating the image of the first user object from the image of the second user object at a fork on the railroad track according to a predetermined condition for changing a course of the image of the first user object.

* * * * *